(12) United States Patent
Ozaki

(10) Patent No.: US 7,945,163 B2
(45) Date of Patent: May 17, 2011

(54) STATION-SIDE APPARATUS OF WAVELENGTH MULTIPLEXING PON SYSTEM, WAVELENGTH AND NETWORK ADDRESS ALLOTTING METHOD AND PROGRAM THEREOF

(75) Inventor: Hirokazu Ozaki, Tokyo (JP)

(73) Assignee: NEC Corporation, Tokyo (JP)

( * ) Notice: Subject to any disclaimer, the term of this patent is extended or adjusted under 35 U.S.C. 154(b) by 869 days.

(21) Appl. No.: 11/727,967

(22) Filed: Mar. 29, 2007

(65) Prior Publication Data
US 2007/0230957 A1    Oct. 4, 2007

(30) Foreign Application Priority Data

Mar. 31, 2006  (JP) ................................. 2006-100873

(51) Int. Cl.
*H04J 14/00* (2006.01)
(52) U.S. Cl. ................. 398/72; 398/71; 398/69; 398/67
(58) Field of Classification Search .................... 398/71, 398/72, 70, 69, 58, 66, 67, 68, 61, 75, 63
See application file for complete search history.

(56) References Cited

U.S. PATENT DOCUMENTS

| | | | | |
|---|---|---|---|---|
| 6,915,079 | B1 * | 7/2005 | Unitt et al. ..................... | 398/99 |
| 7,315,693 | B2 * | 1/2008 | Ovadia et al. .................. | 398/57 |
| 7,373,084 | B2 * | 5/2008 | Yun et al. ....................... | 398/72 |
| 7,483,632 | B2 * | 1/2009 | Sung et al. ..................... | 398/63 |
| 2002/0093709 | A1 * | 7/2002 | Kim et al. ..................... | 359/125 |
| 2005/0025165 | A1 | 2/2005 | Lee et al. | |
| 2005/0074238 | A1 | 4/2005 | Sung et al. | |
| 2005/0117903 | A1 | 6/2005 | Park et al. | |
| 2005/0123300 | A1 * | 6/2005 | Kim et al. ..................... | 398/84 |
| 2005/0129400 | A1 * | 6/2005 | Kim et al. ..................... | 398/67 |
| 2006/0115271 | A1 * | 6/2006 | Hwang et al. .................. | 398/72 |

FOREIGN PATENT DOCUMENTS

| | | |
|---|---|---|
| JP | 11-163802 | 6/1999 |
| JP | 2003-324456 | 11/2003 |
| JP | 2004-32439 | 1/2004 |
| JP | 2004-241855 | 8/2004 |

(Continued)

OTHER PUBLICATIONS

Iannone et al., "Broadcast Digital Video Delivered Over WDM Passive Optical Networks", Jul. 1996, IEEE Photonics Technology Letters, vol. 8, No. 7, pp. 930-932.

(Continued)

*Primary Examiner* — M. R. Sedighian
(74) *Attorney, Agent, or Firm* — Young & Thompson

(57) ABSTRACT

To achieve a station-side apparatus of a wavelength multiplexing PON system, which is capable of saving the wavelength resource through automatically carrying out allotment of the wavelength and the network address to reduce the complicated work for the setting, and through dynamically allotting the wavelength without fixing it in advance. It is a station-side apparatus (OLT) of a wavelength multiplexing PON system that comprises a plurality of in-home apparatuses (ONUs). The station-side apparatus is connected to the in-home apparatuses via transmission paths including an optical multiplexing distributor, and executes allotment of the wavelength in response to wavelength allotment requests from the in-home apparatuses. The station-side apparatus comprises a wavelength/network address allotting device that is provided with a DHCP server in advance, which dynamically allots wavelength and network address to the in-home apparatus in response to the wavelength allotment request from the in-home apparatus.

2 Claims, 24 Drawing Sheets

FOREIGN PATENT DOCUMENTS

| | | |
|---|---|---|
| JP | 2005-203868 | 7/2005 |
| JP | 2006-197489 | 7/2006 |
| JP | 2007-043270 | 2/2007 |

OTHER PUBLICATIONS

Hsieh et al., "Parallel Transport: A New Transport Layer Paradigm for Enabling Internet Quality of Service", Apr. 2005, IEEE Communications Magazine, pp. 114-121.

IETF Document RFC2132, DHCP Options and BOOTP Vendor Extemsions, 68 pages.

IETF Document RFC2131, Dynamic Host Configuration Protocol, 88 pages.

IETF Document RFC2960, Stream Control Transmission Protocol, 268 pages.

European Patent Office Search Report, Jul. 25, 2007.

Park et al., "Fiber-to-the-Home Services Based on Wavelength-Division-Multiplexing Passive Optical Network", Nov. 2004, pp. 2582-2591, XP-011121526.

Handley, et al., "A comprison of WDM PON architectures", 1999, pp. 141-147, XP-00082937.

Japanese Office Action issued Feb. 2, 2011 in corresponding Japanese Application No. 2006-100873 with English translation of pertinent portion.

\* cited by examiner

FIG. 6

| IP Address | Wavelength | MAC Address |
|---|---|---|
| $I_1$ | $(\lambda_{1u}, \lambda_{1d})$ | $M_1$ |
| $I_2$ | $(\lambda_{2u}, \lambda_{2d})$ | $M_2$ |
| $I_3$ | $(\lambda_{3u}, \lambda_{3d})$ | $M_3$ |
| | | |
| | | |
| | | |
| $I_N$ | $(\lambda_{Nu}, \lambda_{Nd})$ | $M_N$ |

FIG. 7

| TCP/UDP port No | ONU IP Address | Wavelength | ONU MAC Addresss |
|---|---|---|---|
| $(P_{1u}, P_{1d})$ | $I_1$ | $(\lambda_{1u}, \lambda_{1d})$ | $M_1$ |
| $(P_{2u}, P_{2d})$ | $I_1$ | $(\lambda_{2u}, \lambda_{2d})$ | $M_1$ |
| $(P_{3u}, P_{3d})$ | $I_2$ | $(\lambda_{3u}, \lambda_{3d})$ | $M_2$ |
| $(P_{4u}, P_{4d})$ | $I_2$ | $(\lambda_{4u}, \lambda_{4d})$ | $M_2$ |
|  |  |  |  |
|  |  |  |  |
| $(P_{Nu}, P_{Nd})$ | $I_M$ | $(\lambda_{Nu}, \lambda_{Nd})$ | $M_M$ |

FIG. 8

| Application No | Stream No | Wavelength | ONU MAC Address |
|---|---|---|---|
| $A_1$ | $S_1$ | $(\lambda_{1u}, \lambda_{1d})$ | $M_1$ |
| $A_1$ | $S_2$ | $(\lambda_{2u}, \lambda_{2d})$ | $M_1$ |
| $A_1$ | $S_3$ | $(\lambda_{3u}, \lambda_{3d})$ | $M_1$ |
| $A_1$ | $S_4$ | $(\lambda_{4u}, \lambda_{4d})$ | $M_1$ |
| | | | |
| $A_M$ | $S_M$ | $(\lambda_{Nu}, \lambda_{Nd})$ | $M_M$ |

FIG. 16

| OP | HTYPE | HLEN | HOPS |
|---|---|---|---|
| TRANSACTION ID | | | |
| SECONDS | | FLAGS | |
| CLIENT IP ADDRESS | | | |
| YOUR IP ADDRESS | | | |
| SERVER IP ADDRESS | | | |
| ROUTER IP ADDRESS | | | |
| CLIENT HARDWARE ADDRESS (16 OCTETS) | | | |
| SERVER HOST NAME (64 OCTETS) | | | |
| BOOT FILE NAME (128 OCTETS) | | | |
| CODE(1) | LENGTH(4) | SUBNET MASK | |
| SUBNET MASK | | CODE(53) | LENGTH(1) |
| TYPE(1-7) | | | | bit positions: 0, 8, 16, 24, 31

FIG. 17

| 0 | 8 | 16 | 24 | 31 |
|---|---|---|---|---|
| OP | HTYPE | HLEN | | HOPS |
| TRANSACTION ID ||||
| SECONDS || FLAGS ||
| CLIENT IP ADDRESS ||||
| YOUR IP ADDRESS ||||
| SERVER IP ADDRESS ||||
| ROUTER IP ADDRESS ||||
| CLIENT HARDWARE ADDRESS (16 OCTETS) ||||
| SERVER HOST NAME (64 OCTETS) ||||
| BOOT FILE NAME (128 OCTETS) ||||
| CODE(128) | LENGTH(4) | $\lambda_{1u}$ ||
| $\lambda_{1d}$ ||| All '0' |

FIG. 18

| 0 | 8 | 16 | 24 | 31 |
|---|---|---|---|---|
| OP | HTYPE | HLEN | | HOPS |
| TRANSACTION ID ||||
| SECONDS | | FLAGS |||
| CLIENT IP ADDRESS ||||
| YOUR IP ADDRESS ||||
| SERVER IP ADDRESS ||||
| ROUTER IP ADDRESS ||||
| CLIENT HARDWARE ADDRESS (16 OCTETS) ||||
| SERVER HOST NAME (64 OCTETS) ||||
| BOOT FILE NAME (128 OCTETS) ||||
| CODE(128) | LENGTH(16) | TCP/UDP PORT No.(up) ||
| $\lambda_{1u1}$ | | TCP/UDP PORT No.(down) ||
| $\lambda_{1d1}$ | | TCP/UDP PORT No.(up) ||
| $\lambda_{1u2}$ | | TCP/UDP PORT No.(down) ||
| $\lambda_{1d2}$ | | All '0' ||

STATION-SIDE APPARATUS OF WAVELENGTH MULTIPLEXING PON SYSTEM, WAVELENGTH AND NETWORK ADDRESS ALLOTTING METHOD AND PROGRAM THEREOF

BACKGROUND OF THE INVENTION

1. Field of the Invention

The present invention relates to a station-side apparatus of a wavelength multiplexing optical access network, a wavelength and network address allotting method executed by the station-side apparatus, and a program thereof. More specifically, the present invention relates to a station-side apparatus of a wavelength division multiplexing PON (Passive Optical Network) system, a wavelength and network address allotting method in the system, and a program thereof.

2. Description of the Related Art

It has been a big issue to achieve broadband of the access circuits due to a rapid spread of the Internet. Various systems such as ADSL, cable modems, and the like have already been put into practical use as the broadband access circuits. However, the passive optical network (PON) has drawn an attention for achieving a still broader band.

The PON is a network where a plurality of users share a single optical fiber by using an optical splitter provided in the middle of the paths. In general, an in-home apparatus (hereinafter, referred to as an ONU: Optical Network Unit) is placed at an end user's home, and a station-side apparatus (hereinafter, referred to as an OLT; Optical Line Terminator) is placed at the station. Both apparatuses are connected through an optical fiber and an optical splitter.

A personal computer of each user is connected to a network through the ONU, which is connected further to a higher network and the Internet through the OLT. The wavelengths of upstream signal (the wavelength is normally 1.3 μm band) and the downstream signal (the wavelength is normally 1.5 μm band) are multiplexed, so that it is possible to connect in both directions by the optical fiber with a single core. Furthermore, recently, there has been a research carried out on a wavelength multiplexing PON that can allot an individual wavelength to each ONU by utilizing a technique of the wavelength division multiplexing (WDM) (For example, "Broadcast digital video delivered over WDM passive optical networks" Iannone, P. P.; Reichmann, K. C.; Frigo, N. J.; Photonics Technology Letters, IEEE Volume 8, Issue 7, July 1996 pp. 930-932 (Non-Patent Literature 1)).

Further, DHCP is known as a client-server type protocol which automatically sets the network parameter. This protocol dynamically allots and informs the parameter such as an IP address to each client when starting up the apparatus, and retrieves the allotted parameter such as the IP address when shutting down the apparatus (For example, IETF Document RFC2131, RFC2132, Dynamic Host Configuration Protocol (Non-Patent Literature 2)).

Incidentally, in a conventional wavelength multiplexing PON system, the wavelength of the optical signal is set manually through a switch of the apparatus or through the operation system. Thus, there requires a lot of work, so that there may generate a setting error. Further, it is necessary to predetermine the correlation between the signal and the wavelength statically. Furthermore, for performing communication, it is necessary to set the network addresses to each ONU, and the setting thereof needs to be performed separately from the setting of the wavelength. This leads to a complication and an increase in the setting time. In addition, it leads to wasting the wavelength resources, since the wavelength is also allotted to the ONUs that are not being used. Moreover, the complication of the setting and the work required therefore are more increased in the case where a plurality of wavelengths are allotted to a single ONU as necessary.

SUMMARY OF THE INVENTION

The object of the present invention is to improve the shortcomings of the above-described conventional case. Specifically, it is to provide a station-side apparatus of a wavelength multiplexing PON system, a wavelength and network allotting method, and a program thereof, which are capable of allotting the wavelength and the network address simultaneously, reducing the work for the allotment (setting for allotting those dynamically), and saving the wavelength resources.

In order to achieve the aforementioned object, the station-side apparatus of a wavelength multiplexing PON system according to the present invention is constituted as follows. That is, it is a station-side apparatus (OLT) of a wavelength multiplexing PON system with a plurality of in-home apparatuses (ONUs), which executes allotment of wavelengths in response to wavelength allotment requests from the in-home apparatuses by being connected thereto via transmission paths including an optical multiplexing distributor, wherein the station-side apparatus comprises a wavelength/network address allotting device that is provided with a DHCP server in advance, which dynamically allots a wavelength and a network address to the in-home apparatus in response to the wavelength allotment request from the in-home apparatus.

With this, the wavelength and the network address can be allotted dynamically and simultaneously even after the connection to the system is established. Thus, it is possible to allot the wavelength flexibly without unreasonably performing allotment for the unnecessary in-home apparatus, so that the network resource can be effectively utilized. As a result, the time for starting up the system can be shortened.

The wavelength/network address allotting device may comprise a wavelength/network address storing device for storing a plurality of wavelengths and network addresses to be allotted, and have a function of calling the wavelength and the network address from the wavelength/network address storing device according to an allotment request signal from the in-home apparatus, and transmitting the wavelength and the network address as an allotment signal when starting up the system.

With this, allotment of the wavelength and the network address can be performed effectively without a waste through interposing the storing device. Therefore, the time for starting up the apparatus can be shortened and the network resource can be effectively utilized.

Further, the station-side apparatus of a wavelength multiplexing PON system may further comprise: an allotment request signal receiving device for receiving the allotment request signal as a first wavelength control signal that is common to the plurality of in-home apparatuses; and an allotment signal transmitting device for transmitting the allotment signal as a second wavelength control signal that is common to the plurality of in-home apparatuses.

With this, the allotment request signal and the allotment signal can be transmitted and received by using a common wavelength. As a result, it is possible to achieve the station-side apparatus of the wavelength multiplexing PON system, which is capable of performing control through effectively utilizing the network resources.

Further, the station-side apparatus of a wavelength multiplexing PON system may further comprise: a collision detecting device for detecting with the first wavelength control signal that the allotment request signals from the plurality of in-home apparatuses are collided; and a collision signal transmitting device for transmitting a collision signal commonly to the plurality of in-home apparatuses by the second wavelength control signal when the collision detecting device detects a collision.

With this, it is possible to achieve the station-side apparatus of the wavelength multiplexing PON system, which is capable of easily carrying out the collision processing of the allotment request signals, with a relatively simple structure.

The wavelength/network address allotting device may be provided with a function of allotting a different wavelength and network address for each of work contents of the in-home apparatus.

With this, it is possible to achieve the station-side apparatus of the wavelength multiplexing PON system, which is capable of allotting the wavelength and the network address for each application and achieving simultaneous high-speed communications with a plurality of connections.

Furthermore, in order to achieve the aforementioned object, the wavelength and network address allotting method according to the present invention is constituted as follows. That is, it is a wavelength and network address allotting method of the station-side apparatus for in-home apparatuses in a wavelength multiplexing PON system that is constituted with a plurality of the in-home apparatuses (ONUs) and the station-side apparatus that is connected to the plurality of in-home apparatuses via transmission paths including an optical multiplexing distributor, wherein the method comprises steps of: an allotment request receiving step which receives the wavelength allotment request from the in-home apparatus; a wavelength allotting step which dynamically allots the wavelength and the network addresses to the in-home apparatus in response to the received allotment request by using a DHCP server that is provided in advance; and an allotment wavelength transmitting step which transmits the allotted wavelength and the network address to the in-home apparatus that has transmitted the allotment request.

With this, the wavelength and the network address can be allotted dynamically and simultaneously, so that the network resources can be more flexibly utilized. In addition, the time for starting up the apparatus can be shortened.

Moreover, in order to achieve the aforementioned object, the wavelength and network address allotting method according to the present invention is constituted as follows. That is, it is a wavelength and network address allotting method of the station-side apparatus for in-home apparatuses in a wavelength multiplexing PON system that is constituted with a plurality of the in-home apparatuses (ONUs) and the station-side apparatus that is connected to the plurality of in-home apparatuses via transmission paths including an optical multiplexing distributor, wherein the method comprises steps of: an allotment request receiving step which, when starting up the wavelength multiplexing PON system, receives the allotment requests from the in-home apparatuses by using a first wavelength control signal that is common to the plurality of in-home apparatuses; a collision detecting step which detects a collision between the allotment requests that are transmitted from the plurality of in-home apparatuses; a readout step which reads out the wavelength and the network address to be allotted from a wavelength/network address storing device, when a collision is not detected in the collision detecting step; and an allotment signal transmitting step which transmits and allots the wavelength and the network address read out in the readout step to the in-home apparatus as an allotment signal by using a second wavelength control signal that is common to the plurality of in-home apparatuses.

With this, allotment request of the wavelength and the network address as well as the allotment thereof can be performed effectively. Therefore, it becomes possible to shorten the time for starting up the apparatus and effectively utilize the network resource.

There may also be provided a collision signal transmitting step which transmits a common collision signal to the plurality of in-home apparatuses by using a second wavelength control signal, when a collision is detected in the collision detecting step.

In order to achieve the aforementioned object, the wavelength and network address allotting program according to the present invention is constituted as follows. That is, the program allows a computer, which constitutes a station-side apparatus of a wavelength multiplexing PON system that is constituted with a plurality of in-home apparatuses and the station-side apparatus that is connected to the plurality of in-home apparatuses via transmission paths including an optical multiplexing distributor, to execute: an allotment request reception processing function which performs reception processing of a wavelength allotment request from the in-home apparatus; a wavelength allotment processing function which dynamically allots the wavelength and the network address to the in-home apparatus in response to the reception-processed allotment request by using a DHCP server that is provided in advance; and an allotted wavelength transmission processing function which performs transmission processing of the allotted wavelength and the network address to the in-home apparatus that has transmitted the allotment request.

Moreover, in order to achieve the aforementioned object, the wavelength and network address allotting program according to the present invention is constituted as follows. That is, the program allows a computer, which constitutes a station-side apparatus of a wavelength multiplexing PON system that is constituted with a plurality of in-home apparatuses and the station-side apparatus that is connected to the plurality of in-home apparatuses via transmission paths including an optical multiplexing distributor, to execute: an allotment request reception processing function which, when starting up the wavelength multiplexing PON system, receives the allotment requests from the in-home apparatuses by using a first wavelength control signal that is common to the plurality of in-home apparatuses; a collision information processing function which, when a collision is detected between the allotment requests transmitted from the plurality of in-home apparatuses, performs processing of information on the detected collision; a readout processing function which reads out the wavelength and the network address to be allotted from a wavelength/network address storing device, when a collision between the allotment requests is not detected; and an allotment signal transmission processing function which transmits and allots the wavelength and the network address read out in the readout step to the in-home apparatus as an allotment signal by using a second wavelength control signal that is common to the plurality of in-home apparatuses.

With this, it is possible to obtain a program that functions almost equivalent to the case of the above-described station-side apparatus of the wavelength multiplexing PON system.

The present invention is designed to allot the wavelength and the network address simultaneously and dynamically without a waste. Therefore, it is possible to provide an excellent effect which cannot be attained with the conventional techniques. That is, the present invention provides a station-side apparatus of a wavelength multiplexing PON system, a wavelength and network address allotting method and a program thereof, which are capable of saving the resources of the wavelength and the network address and achieving efficient control of the network.

BRIEF DESCRIPTION OF THE DRAWINGS

FIG. 6 is an illustration for describing an example of the wavelength allotment information that is stored in a memory of the station-side apparatus shown in FIG. 4;

FIG. 7 is an illustration for describing another example of the wavelength allotment information that is stored in the memory of the station-side apparatus shown in FIG. 4;

FIG. 8 is an illustration for describing still another example of the wavelength allotment information that is stored in the memory of the station-side apparatus shown in FIG. 4;

FIG. 16 is an illustration for describing an example of the DHCP message format in which a subnet mask and the DHCP message type are stored in an OPTION field;

FIG. 17 is an illustration for describing a format of the DHCP message when a single network address and a wavelength each for the upstream and downstream are allotted to a single in-home apparatus;

FIG. 18 illustrates a format of the DHCP message when a wavelength is allotted for each application;

DETAILED DESCRIPTION OF THE PREFERRED EMBODIMENTS

An embodiment of the present invention will be described hereinafter by referring to the accompanying drawings.

The outline of the PON system that is the technical basis of this embodiment will be described first, and the contents of the embodiment will be described in detail thereafter.

(Basic Structure of PON System)

Figure 19:
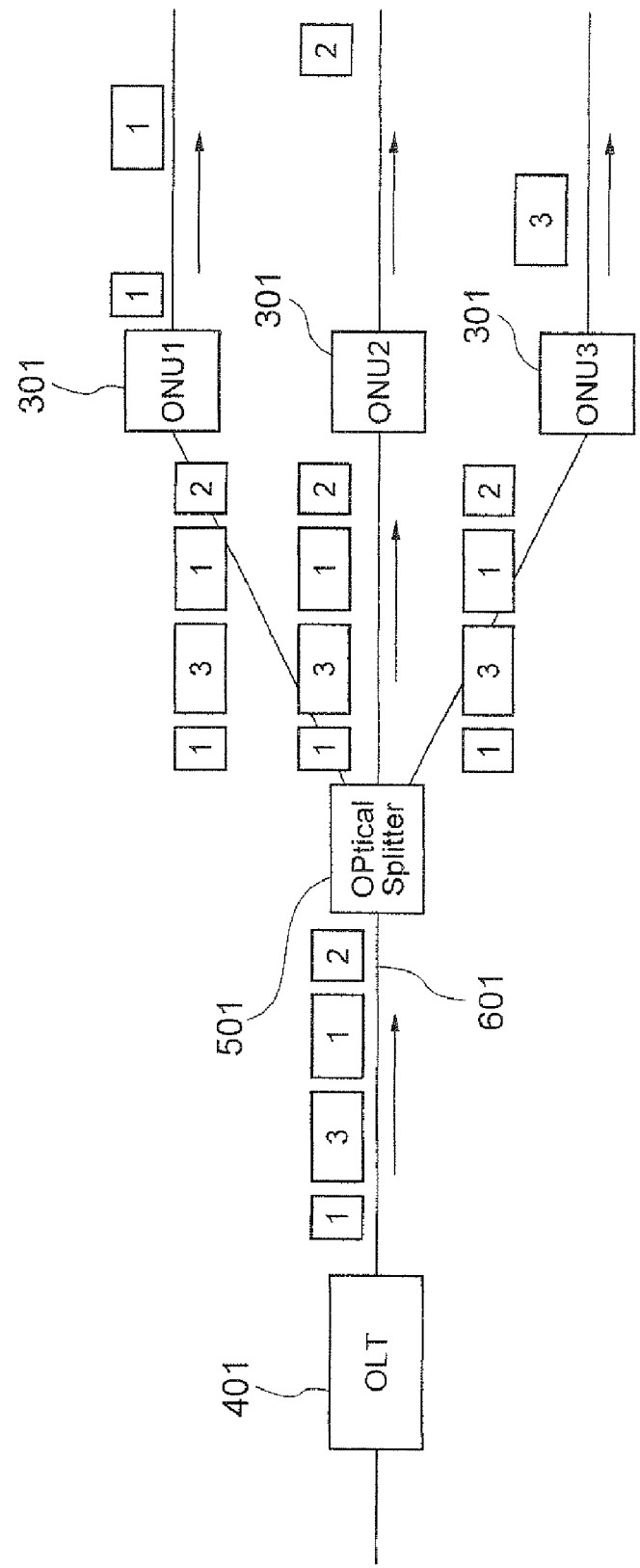
FIG. 19 illustrates the basic structure of a conventional PON system and signals transmitted therein, which describes the flow of the downstream signal.
Figure 20:
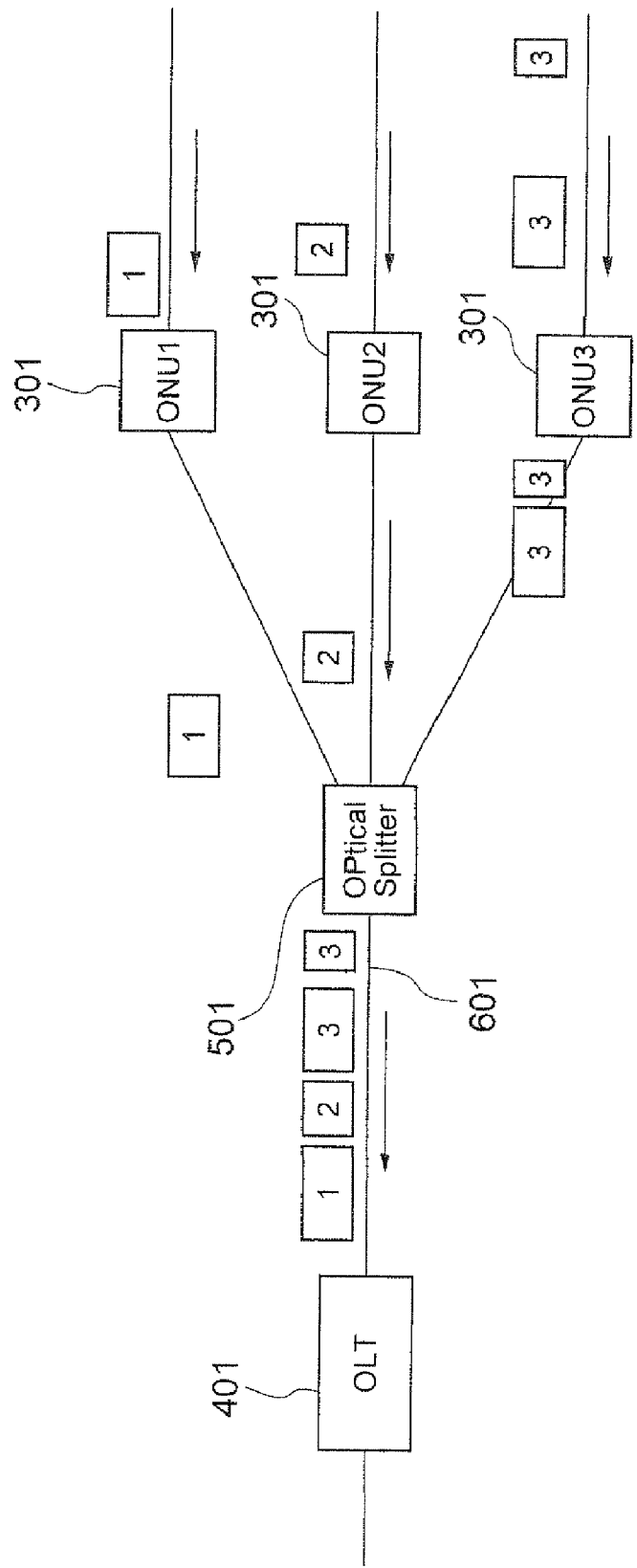
FIG. 20 illustrates the basic structure of a conventional PON system and signals transmitted therein, which describes the flow of the upstream signal.

FIG. 19 and FIG. 20 illustrate the basic structure of the PON system and the flow of the signals transmitted therein.

In FIG. 19 and FIG. 20, reference numeral 401 is a station-side apparatus (OLT), 301 is an in-home apparatus (ONU), 501 is an optical splitter, and 601 is an optical fiber.

As shown in FIG. 19 and FIG. 20, the ONU 301 is placed at each end-user's home, and the OLT 401 is placed at the station. The ONUs 301 and the OLT 401 are connected via the optical fiber 601 and the optical splitter 501. Personal computers of each user are connected to the network via the ONU 301, which are connected further to the higher network and the Internet through the OLT 401. The wavelength of the upstream signal (wavelength thereof is normally 1.3 μm band) and that of the downstream signal (wavelength thereof is normally 1.5 μm band) are multiplexed, so that those are connected in both directions through the optical fiber with a single core.

FIG. 19 and FIG. 20 illustrate the flow of the signals in the case where there are three ONUs 301 being connected. Specifically, FIG. 19 shows the flow of the downstream signals, and FIG. 20 shows the flow of the upstream signals. Squares with numbers indicate the frames of the signals that are transmitted to/from each of the ONUs 301.

Figure 21:
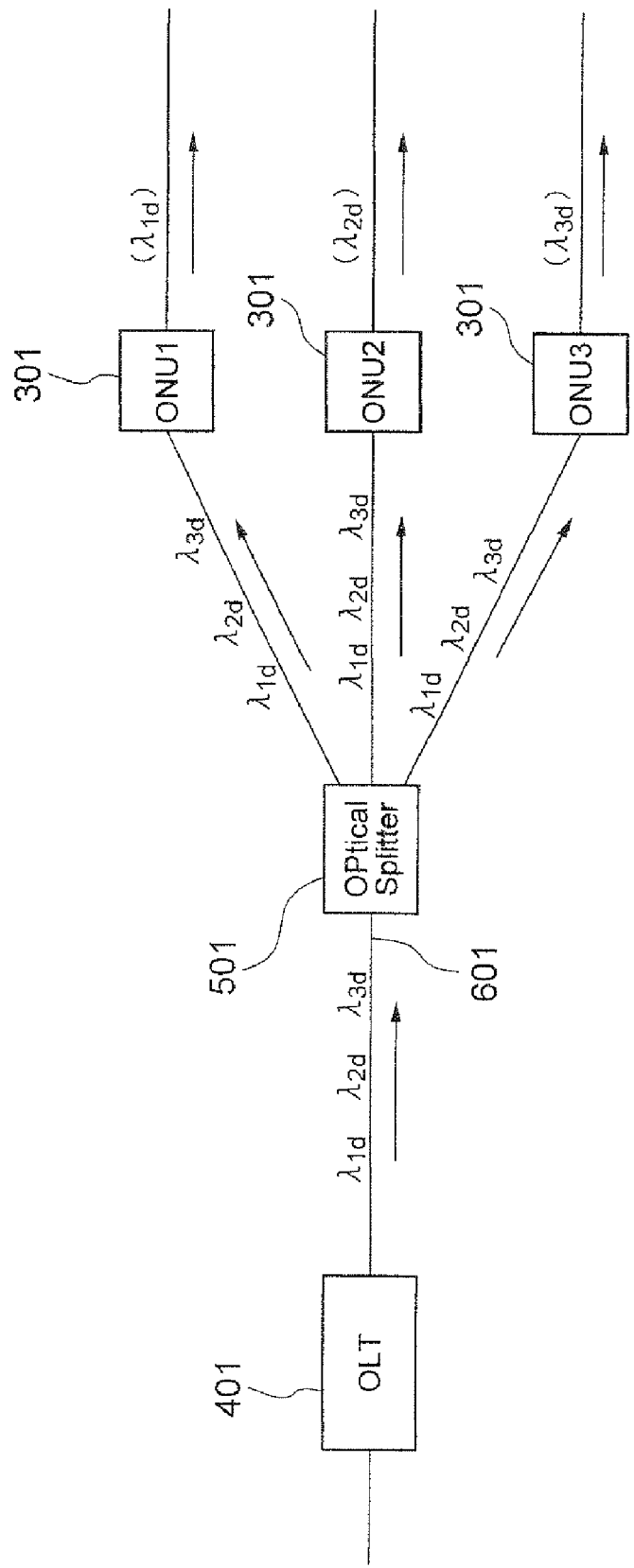
FIG. 21 illustrates the basic structure of a conventional wavelength division multiplexing PON system and signals transmitted therein, which describes the flow of the downstream multiplexed signal.
Figure 22:
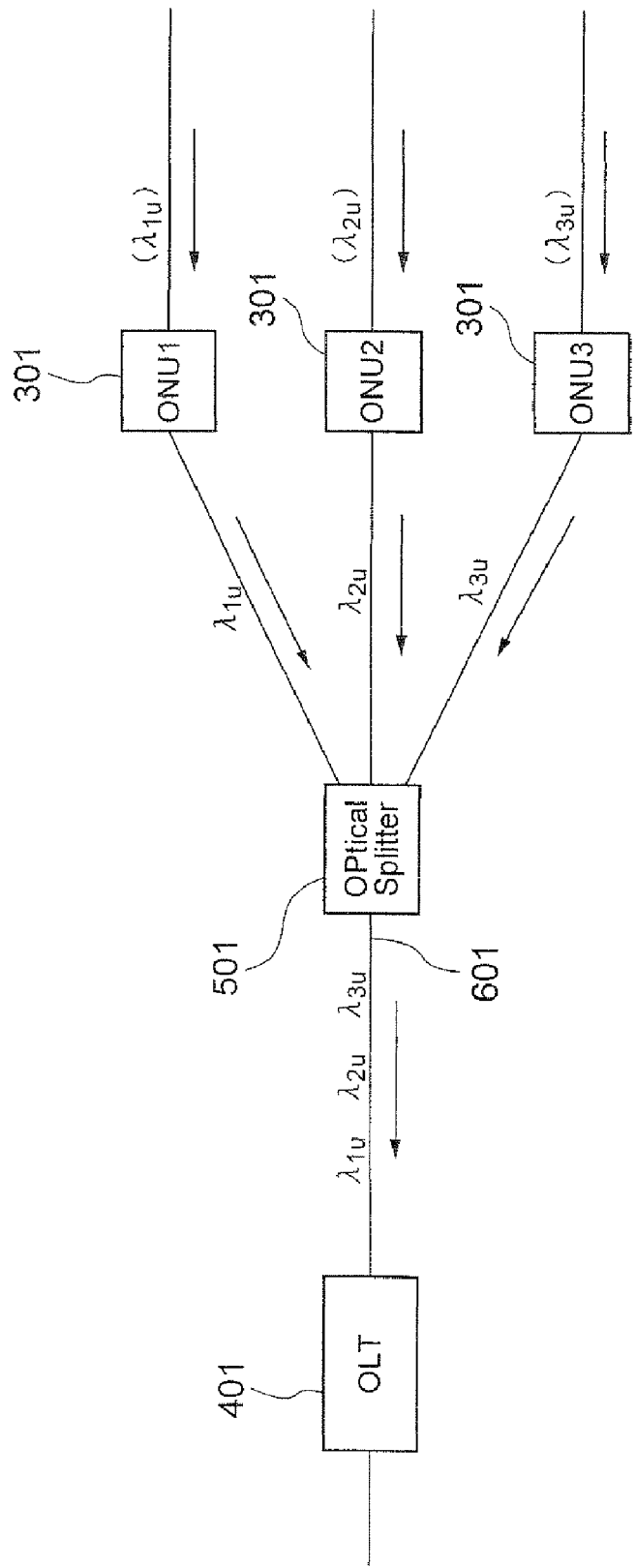
FIG. 22 illustrates the basic structure of a conventional wavelength division multiplexing PON system and signals transmitted therein, which describes the flow of the upstream multiplexed signal.

Further, as shown in FIG. 21 and FIG. 22, a research of the wavelength multiplexing PON that can allot individual wavelength to each of the ONUs 301 by utilizing the wavelength division multiplexing (WDM) technique has been in progress. In FIG. 21 and FIG. 22, the reference numerals 301, 401, 501, and 601 are the same as those of FIG. 19 and FIG. 20.

In the wavelength multiplexing PON, a signal (to which individual wavelengths that allotted in advance to each ONU 301 are multiplexed) is transmitted as the downstream signal from the OLT 401 through broadcast. Each ONU 301 fetches only the signal of the wavelength for the own apparatus by using a wavelength filter. Furthermore, the upstream signals from each ONU 301 are transmitted with individual wavelengths, which are joined and multiplexed at the optical splitter 501 to be sent to the OLT 401. The OLT 401 separates the signals from each ONU 301 by using a spectroscope and receives the signals separately.

FIG. 21 and FIG. 22 illustrate the flow of the signals in the case where there are three ONUs 301 being connected. Specifically, FIG. 21 shows the flow of the downstream signals, and FIG. 22 shows the flow of the upstream signals.

λid (i=1, 2, 3) indicate the downstream signals for each ONU 301, and λiu (i=1, 2, 3) indicate the upstream signals for each ONU 301. Further, (λid) (i=1, 2, 3) indicate electric signals outputted from each ONU 301, and (λiu) (i=1, 2, 3) indicate electric signals inputted to each ONU 301, respectively. These are connected to terminals such as personal computers and work stations.

For forming the wavelength multiplexing PON, it is necessary to allot the specific wavelength to the upstream signals and the downstream signals for each of the ONUs 301. For achieving this allotment, it is necessary to set the wavelength for each of the ONUs 301 and the OLT 401 in advance before starting up the system. This setting can be performed through the operation system or performed directly by manually operating the apparatuses. In any cases, it is a complicated work since it is done by hands. Also, it requires a lot of time and may generate a setting error. Thus, when allotting a plurality of wavelengths for a single ONU 301, it becomes more complicated, thereby increasing the time required for the setting. Moreover, it is necessary to set the network address (IP address) for each of the ONUs 301 and the OLT 401, in addition to allotting the wavelength.

Figure 23:
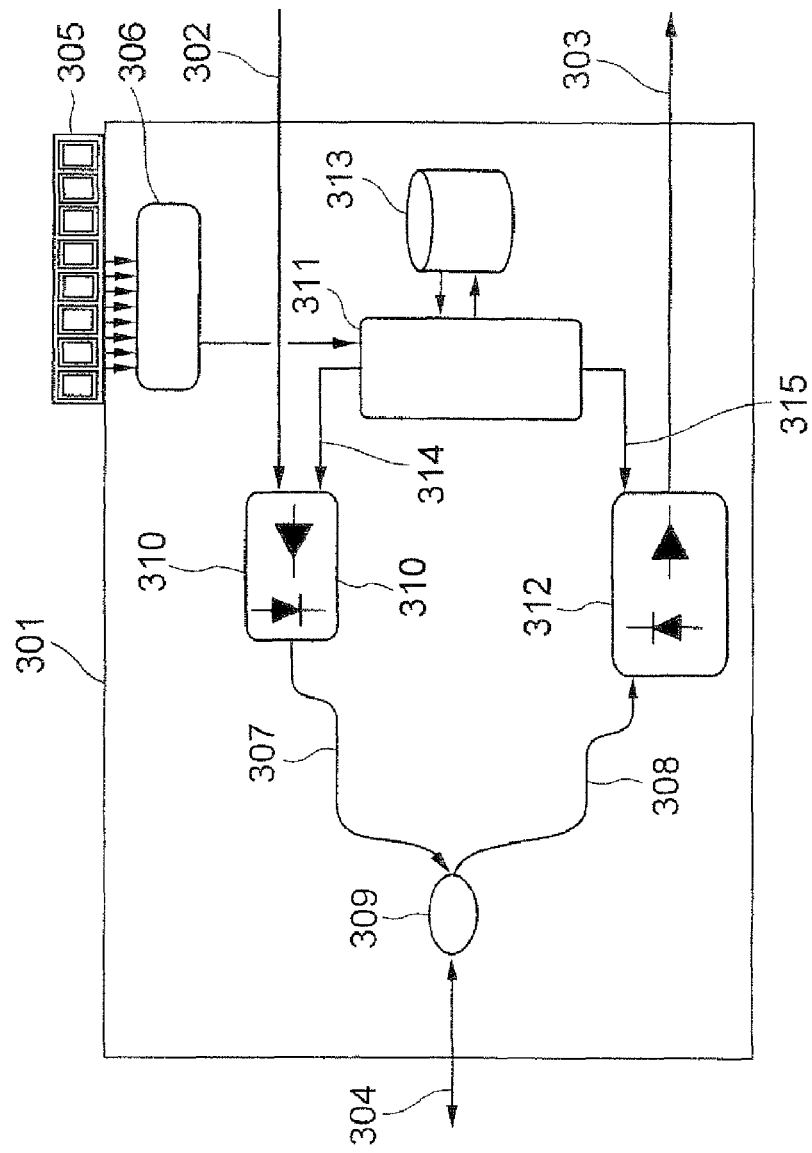
FIG. 23 is a block diagram for showing the structure of a conventional in-home apparatus.

FIG. 23 shows an example of the structure of the ONU 301. In FIG. 23, reference numeral 301 is the ONU main body, 302 is an input electric signal for the ONU 301, 303 is an output electric signal from the ONU 301, and 304 is an optical signal fiber (and an optical signal transmitted therethrough), which is connected to the OLT 401. FIG. 23 shows a conventional example in which the wavelengths are set directly to the apparatuses manually. Reference numeral 305 is a switch for the setting, 306 is a switch interface circuit, 307 and 308 are optical fibers and the optical signals, 309 is an optical splitter, 310 is an electrooptic converting unit, 311 is a wavelength control circuit, 312 is a photoelectric converting unit, 313 is a memory, and 314 and 315 are wavelength control signals.

The information set through the switch 305 is transmitted to the wavelength control circuit 311 via the switch interface circuit 306 and stored in the memory 313. At the same time, specific optical wavelengths of the electrooptic converting unit 310 and the photoelectric converting unit 312 are set by the wavelength control circuit 311 through the wavelength control signals 314 and 315, based on the information.

The electrooptic converting unit 310 converts the input electric signal 302 to the optical signal of the set wavelength, and outputs it to the optical fiber 307. Meanwhile, the photoelectric converting unit 312 to which the wavelength-multiplexed optical signal 304 is inputted selects only the optical signal of the set wavelength, and converts it to the electric signal 303.

The optical signal 307 is sent out to the optical fiber 304 as the upstream signal of the ONU 301, and the downstream signal of the fiber 304 is inputted to the photoelectric converting unit 312 as the optical signal 308.

Figure 24:
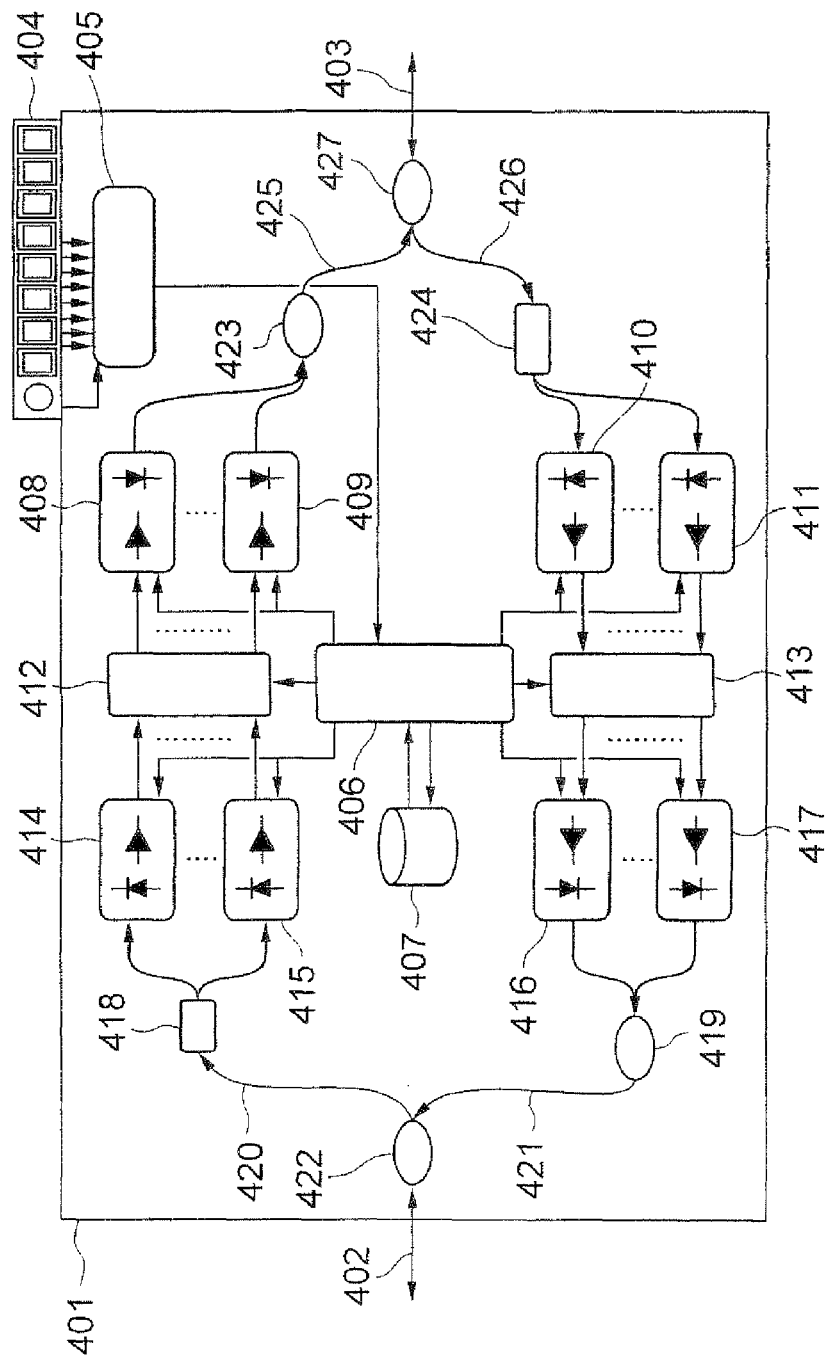
FIG. 24 is a block diagram for showing the structure of a conventional station-side apparatus.

FIG. 24 shows an example of the structure of the OLT 401.

In FIG. 24, reference numeral 401 is the OLT main body, 402 is an optical fiber (and the signal thereof) for connecting to a higher apparatus, and 403 is the optical fiber (and the signal thereof), which is connected to each of the ONUs 301 via the optical splitter. Reference numeral 404 is a switch for the setting, 405 is a switch interface circuit, 406 is a control unit, 407 is a memory, 408, 409, 416, 417 are electrooptic converting units, 410, 411, 414, 415 are photoelectric converting units, 412, 413 are main signal processing units, 418 is an optical divider, 419 is an optical coupler, 420, 421, 425, 426 are optical fibers and the signals thereof, 422, 427 are optical splitters, 423 is an optical suppler, and 424 is an optical divider.

The wavelength information set at the switch 404 reaches the control unit 406 through the switch interface circuit 405. The wavelength information is stored in the memory 407 and, at the same time, it is set in each of the photoelectric converting units 414, 415, 410, 411 and each of the electrooptic converting units 408, 409, 416, 417.

The photoelectric converting units 414, 415, 410, and 411 select only the optical signal of the respectively set wavelength from the wavelength-multiplexed signals, and convert each optical signal to an electric signal. Further, the electrooptic converting units 408, 409, 416, and 417 convert the respective electric signal to the optical signal of the set wavelength.

The main signal processing units 412 and 413 perform processing of layers 1 to 3 (or layer 4 in some cases as necessary) for replacing overheads and tags, changing, copying, or filtering signals.

The upstream signals outputted from each of the ONUs 301 are wavelength-multiplexed at the optical splitter 501 placed on the way and inputted to the OLT 401 as the optical signal 403, which are then inputted to the photoelectric converting units 410, 411 through the optical splitter 427 and the optical divider 424 within the OLT 401. Only the optical signal of the preset wavelength is selected herein and converted to the electric signal.

Each of the electric signals receives the necessary processing at the main signal processing unit 413, which is then converted to the optical signal of the preset wavelength again by the electrooptic converting units 416, 417. Then, the converted optical signals are outputted to the higher apparatus through the optical coupler 419 and the optical splitter 422.

In the meantime, the optical signal 402 inputted from the higher apparatus passes through the optical splitter 422 and the optical divider 418 within the OLT 401. Then, the optical signal of the preset wavelength is selected at the electrooptic converting units 414 and 415 to be converted into an electric signal. After receiving the necessary processing at the main signal processing unit 412, each of the electric signals is converted to the optical signals of the preset wavelengths again by the electrooptic converting units 408, 409.

Then, the converted optical signals are outputted through the optical coupler 423 and optical splitter 427 to the optical fiber 403 that is connected to each of the ONUs 301.

In the conventional wavelength multiplexing PON system described above, the wavelengths of the optical signals are set manually through the switch of the apparatus or the operation system. Thus, it requires a lot of work, and there may generate a setting error. Furthermore, it is necessary to predetermine the corresponding relation between the signals and the wavelengths statically.

Moreover, it is necessary to set the network address to each of the ONUs 301 in advance for performing communication, which needs to be performed separately from the setting of the wavelengths. Thus, it increases the complication of the setting as well as the time necessary for the setting. In addition, the wavelength is allotted also to the ONU 301 that is not being used, so that it faces such issues that the wavelength resource is wasted, etc.

Furthermore, in the case where a plurality of wavelengths are allotted to a single ONU 301 as required, complication and work for the setting are more increased.

The present invention is designed to overcome such issues and to provide a station-side apparatus that is capable of achieving high-throughput communication, an allotting method of wavelength and network address, and a program for achieving it through introducing the dynamic automatic allotment processing for allotting the wavelengths and the network address in the wavelength multiplexing PON in order to simplify the setting, to save the resources of the wavelength and network address, and to achieve high-speed/effective network control, and further to enable allotment of the wavelength by a connection unit (by each application).

Structure of the Embodiment

Figure 1:
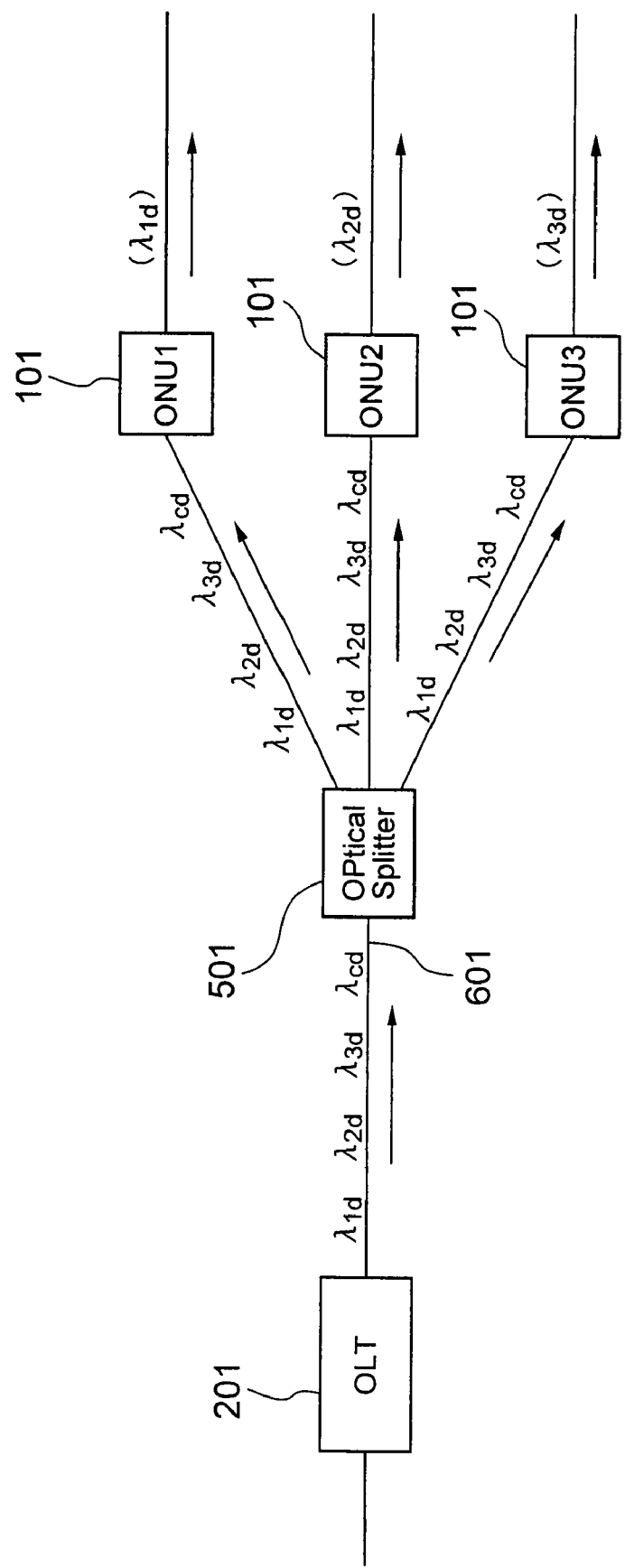
FIG. 1 illustrates the structure of a PON system and signals transmitted therein according to an embodiment of the present invention, which describes the flow of downstream main signal.
Figure 2:
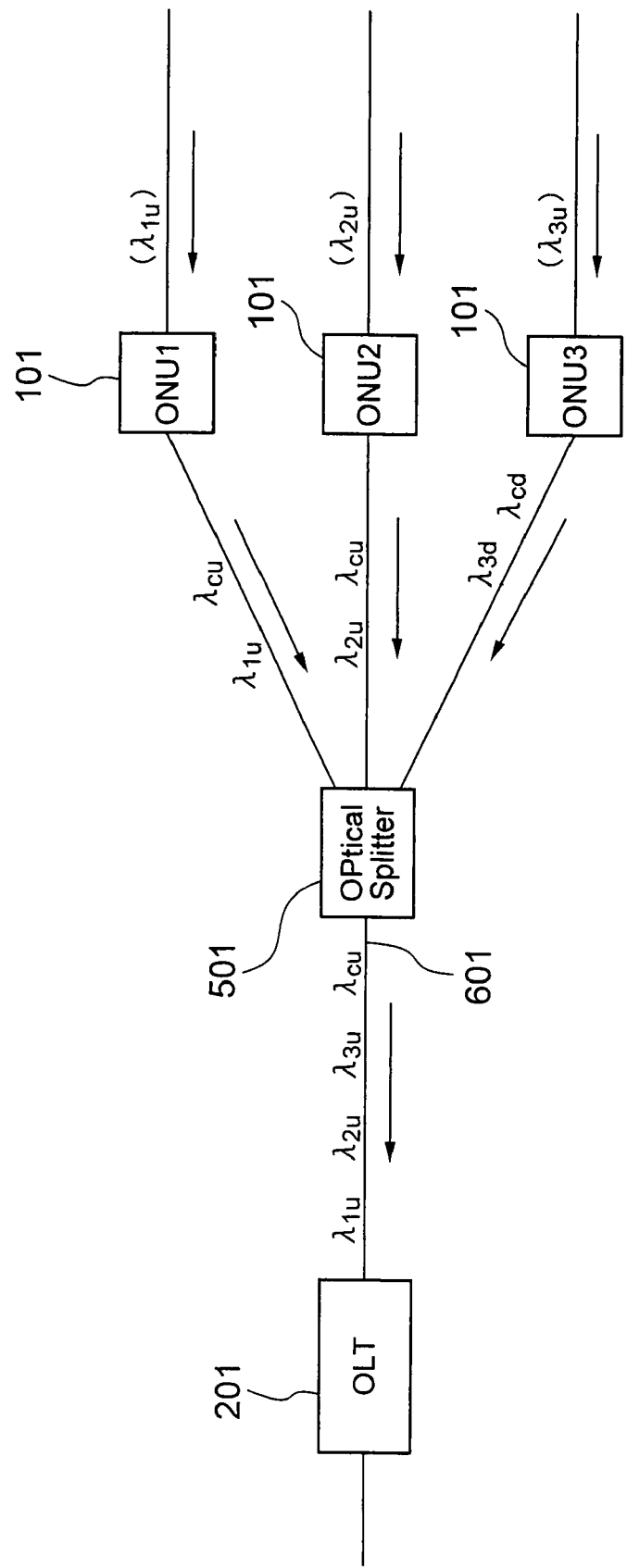
FIG. 2 illustrates the structure of a PON system and signals transmitted therein according to an embodiment of the present invention, which describes the flow of upstream main signal.

FIG. 1 and FIG. 2 illustrate the structure of the PON system according to the embodiment, and the flow of the signals transmitted therein. In FIG. 1 and FIG. 2, reference numeral 101 is an in-home apparatus (ONU), 201 is a station-side apparatus (OLT), 501 is an optical splitter, and 601 is an optical fiber.

In FIG. 1 and FIG. 2, λid (i=1, 2, 3) indicate the downstream main signals for each of the ONUs 101, and λiu (i=1, 2, 3) indicate the upstream main signals from each of the ONUs 101. Further, λcd indicates the downstream control signal, and λcu indicates the upstream control signal. The wavelengths of λcd and λcu are used commonly in the OLT 201 and all of the ONUs 101. Furthermore, (λid) (i=1, 2, 3) indicate electric signals outputted from each of the ONUs 101, and (λiu) (i=1, 2, 3) indicate electric signals inputted to each of the ONUs 301. These are connected to terminals such as personal computers and work stations.

The embodiment is the same with the conventional case in respect that the specific wavelength needs to be allotted to the upstream and downstream signals for each of the ONUs 101 in order to constitute the wavelength multiplexing PON. However, the embodiment is structured in such a manner that the apparatus performs the allotment independently and dynamically.

Figure 3:
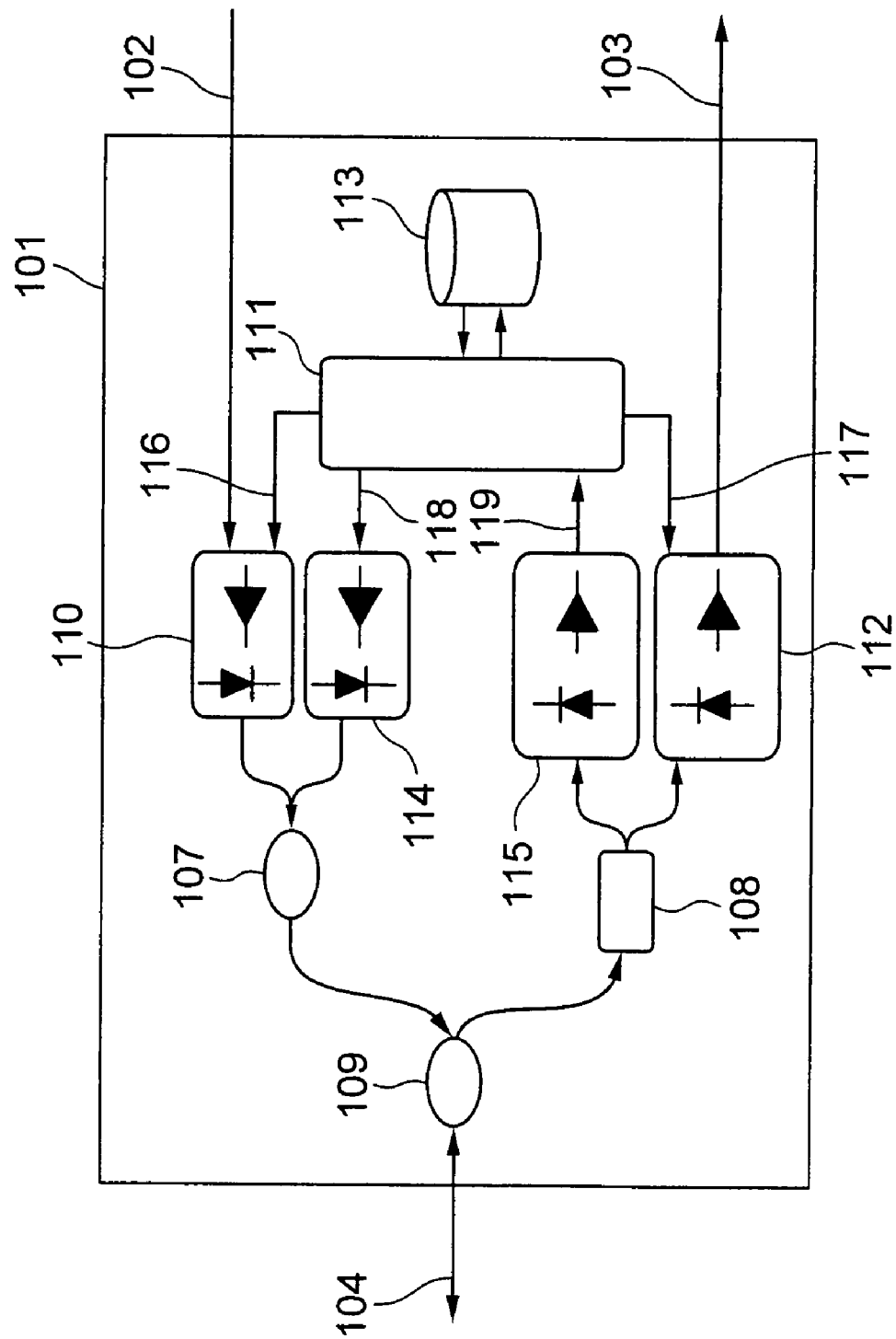
FIG. 3 is a block diagram for showing the structure of an in-home apparatus according to the embodiment.

FIG. 3 shows an example of the structure of the ONU 101 to which the present invention is applied. In FIG. 3, reference numeral 101 is the ONU main body, 102 is an input electric signal for the ONU 101, 103 is an output electric signal from the ONU 101, and 104 is an optical signal fiber (and the optical signal transmitted therethrough), which is connected to the OLT 201. Further, 107 and 108 are optical fibers and the optical signals thereof, 109 is an optical splitter, 110, 114 are electrooptic converting units, 111 is a control unit, 112, 115 are photoelectric converting unit, 113 is a memory, 116, 117 are wavelength control signals, and 118, 119 are optical fibers and the optical signals transmitted therethrough.

The difference between the embodiment and the case of FIG. 23 described above are that: there is no switch 305 for setting the wavelength manually and the interface circuit 306 in this case shown in FIG. 3; the electrooptic converting unit 114 and the photoelectric converting unit 115 for transmitting/receiving the control signal for allotting the wavelength are added; and a function of controlling the control signal is added to the control unit 111.

Figure 4:
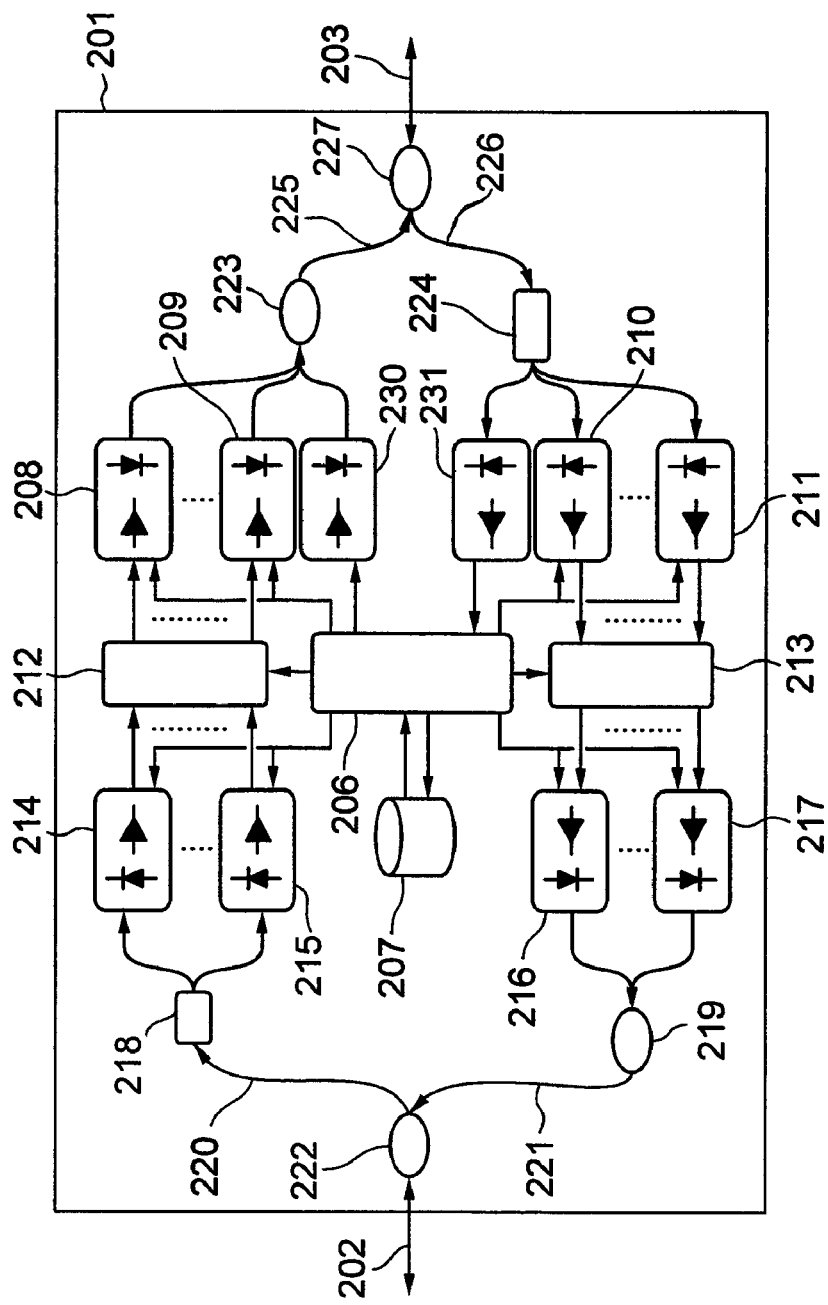
FIG. 4 is a block diagram for showing the structure of a station-side apparatus according to the embodiment.

FIG. 4 shows an example of the structure of the OLT 201 to which the present invention is applied.

In FIG. 4, reference numeral 201 is the OLT main body, 202 is an optical fiber (and the signal thereof) for connecting to a higher apparatus, and 203 is the optical fiber (and the signal thereof), which is connected to each of the ONUs 101 via the optical splitter. Reference numeral 206 is a control unit, 207 is a wavelength/network address unit, 208, 209, 216, 217, 230 are electrooptic converting units, 210, 211, 214, 215, 231 are photoelectric converting units, 212, 213 are main signal processing units, 218 is an optical divider, 219 is an optical coupler, 220, 221, 225, 226 are optical fibers and the signals thereof, 222, 227 are optical splitter, 223 is an optical coupler, and 224 is an optical divider.

The difference between the embodiment and the case of FIG. 24 described above are that: there is no switch 405 for setting the wavelength manually and the interface circuit 406 in this case shown in FIG. 4; the electrooptic converting unit 230 and the photoelectric converting unit 231 for transmitting/receiving the control signal for allotting the wavelength are added; a function of controlling the control signal is added to the control unit 206; and the wavelength/network unit 207 has a function of allotting the wavelength and the network (IP address in this case) dynamically, in addition a memory function.

Specifically, the wavelength/network address unit 207 is provided with a function of a DHCP server 2071. Further, a plurality of wavelengths and network addresses which can be set are stored in advance in a wavelength/network address storing device 2072 of the wavelength/network address unit 207. The DHCP is a protocol which automatically performs network setting including the network address.

Figure 5:
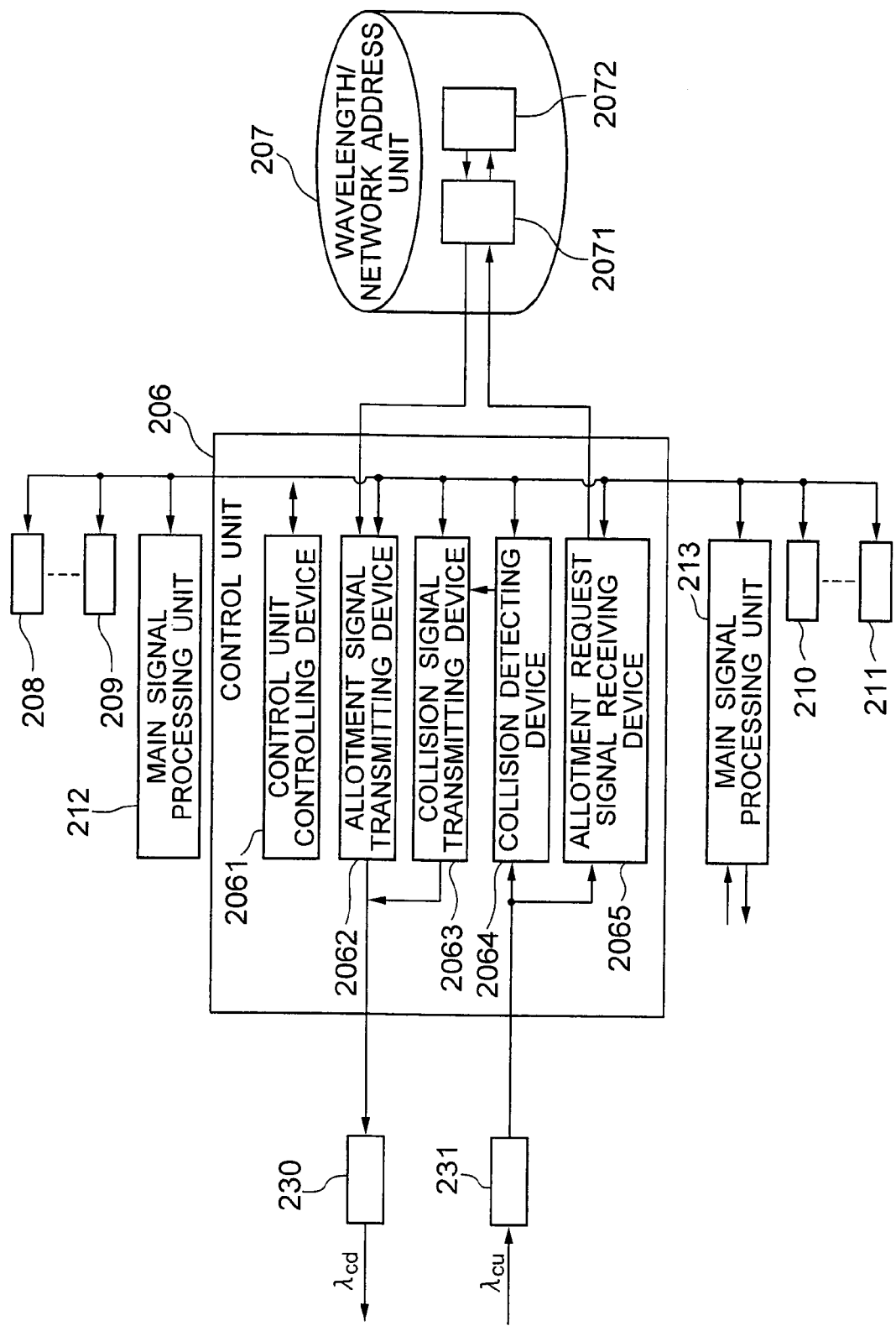
FIG. 5 is a functional block diagram for showing the functions of the station-side apparatus shown in FIG. 4.

FIG. 5 shows a functional block diagram of the control unit 206 and the wavelength/network address unit 207 according to the embodiment.

In FIG. 5, the control unit 206 comprises: an allotment request signal receiving device 2605 which detects an allotment request from the electric signal (converted by the photoelectric converting unit 231) among allotment request signals being sent as the upstream control signals (the wavelength thereof is λcu that is in common to each of the ONUs 101); and a collision detecting device 2604 which detects a collision of the allotment request signals.

When receiving the allotment request signal without a collision, the allotment request signal receiving device 2065 transmits the allotment request signal to the wavelength/network address unit 207. Upon this, the DHCP server 2071 of the wavelength/network address unit 207 reads out a piece of wavelength allotment information from the wavelength/network address storing device 2072 to send it to an allotment signal transmitting device 2062. The allotment signal transmitting device 2062 converts the wavelength allotment information at the electrooptic converting unit 230 and transmits it as the downstream control signal (the wavelength thereof is λcd that is in common to each of the ONUs 101).

When there is a collision between the allotment request signals, the collision detecting device 2604 detects the collision and informs it to a collision signal transmitting device 2063. Upon this, the collision signal transmitting device 2063 transmits a collision signal to each of the ONUs 101 as the downstream control signal through broadcast.

The control unit 206 includes a control unit controlling device 2061 for controlling various functions within the control unit 206. At the same time, the control unit controlling device 2061 controls the main signal processing units 212, 213, and performs wavelength allotment for the electrooptic converting unit 208, 209, and the photoelectric converting units 210, 211.

FIG. 6 illustrates an example of the wavelength allotment information that is stored in the wavelength/network address storing device 2072 of the wavelength/network address unit 207. Furthermore, FIG. 7 illustrates another example of the wavelength allotment information.

In the case of FIG. 6, the wavelength allotment information is managed in a combination of the network address (IP address in the case of FIG. 6), the wavelengths (a pair of the wavelengths for the upstream and downstream), and hardware address (MAC ADDRESS) of the ONU.

In the case of FIG. 7, the wavelength allotment information is managed in a combination of the application discriminating information (a pair of TCP/UDP port numbers for the upstream and downstream in the case of FIG. 7), the network address (IP address in the case of FIG. 7), the wavelengths (a pair of the wavelengths for the upstream and the downstream), and hardware address (MAC ADDRESS in the case of FIG. 7) of the ONU.

FIG. 8 illustrates still another example of the wavelength allotment information. In this case, a single application contains a plurality of streams or chunks (stream IDs in the case of FIG. 8), and individual wavelengths (a pair of the wavelengths for the upstream and downstream) are allotted to each of the streams.

Practically, it illustrates the structure for achieving an application that uses SCTP (IETF Document RFC2960: Stream Control Transmission Protocol) that is defined by IETF, an application using parallel TCP that is proposed in IEEE Communication Magazine (April 2005, p. 114H. Hsieh et al., Parallel Transport: A New Transport Layer Paradigm for Enabling Internet Quality of Service), and a QoS (Quality of Service) control while effectively utilizing the wavelength resource. Further, it is also possible to achieve a structure that enables execution of dynamic wavelength allotment in accordance with the load state, through providing a device for monitoring the load state of the PON network.

Next, the entire operation of the above-described embodiment will be described.

The operation of the wavelength and network address allotting method according to the present invention will also be described herein.

Figure 9:
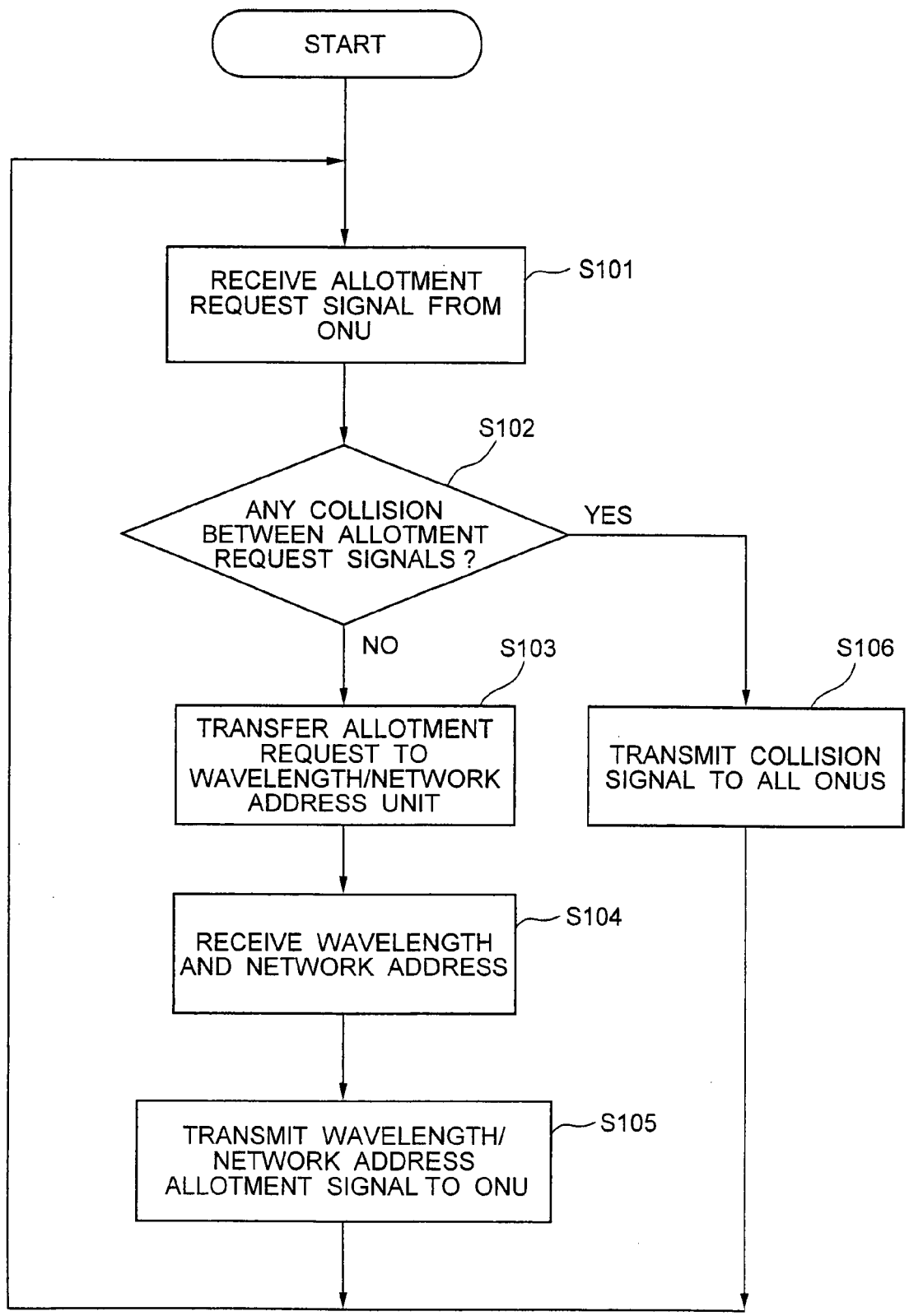
FIG. 9 is a flowchart for showing the operation of a control unit of the station-side apparatus shown in FIG. 4, when allotting the wavelength and the network address.
Figure 10:
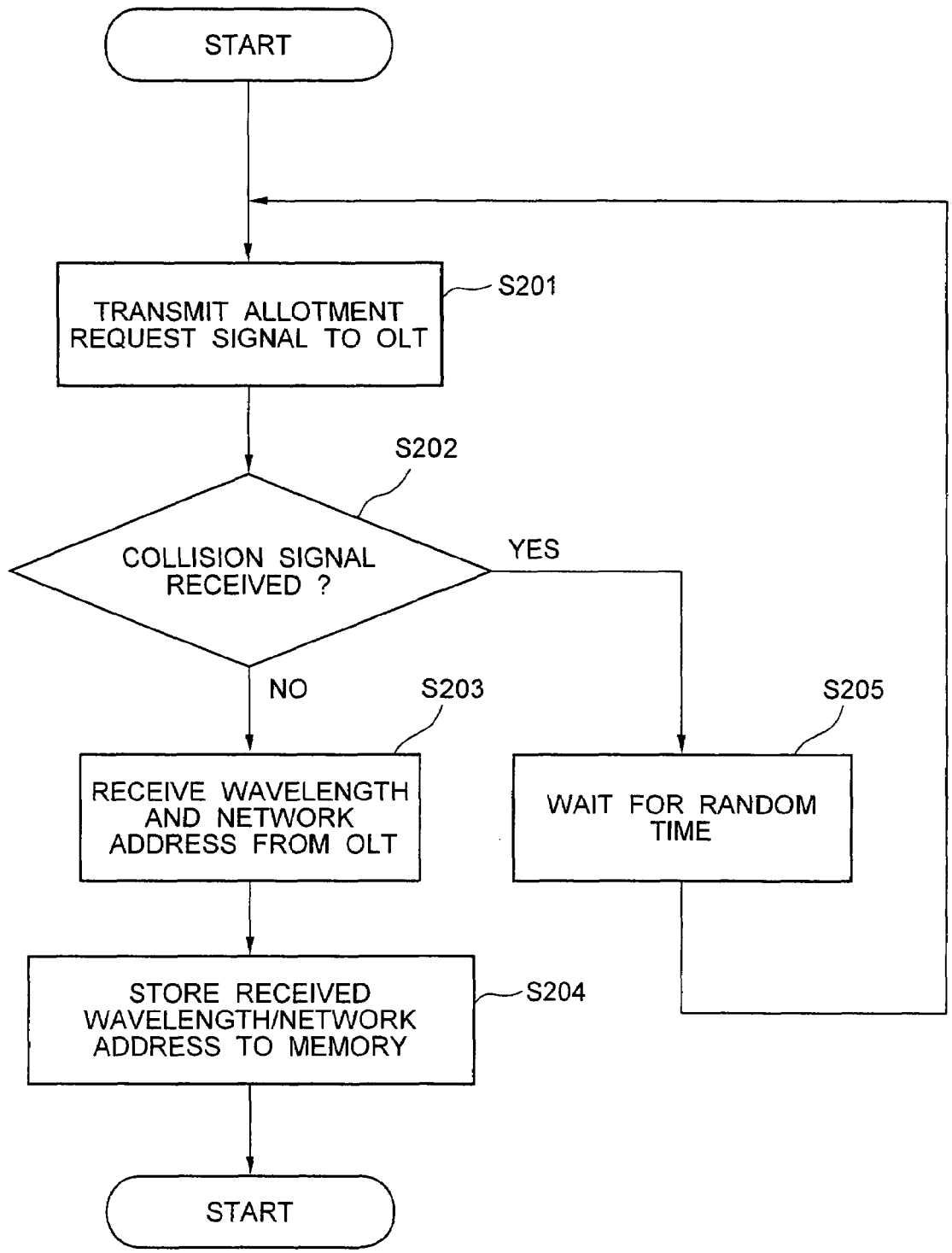
FIG. 10 is a flowchart for showing the operation of the in-home apparatus shown in FIG. 3, when allotting the wavelength and the network address.

FIG. 9 is a flowchart for showing the operation of the control unit 206 of the OLT 201 when allotting the wavelength and the network address, and FIG. 10 is a flowchart for showing the operation of the ONU 101 when allotting the wavelength and the network address.

Referring to FIG. 2, when starting up the system, each of the ONUs 101 transmits the requests for allotting the wavelength and the network address to the OLT 201 by using the upstream control signal (the wavelength thereof is the common $\lambda cu$) (step 201 of FIG. 10). The control unit 206 of the OLT 201 receives the allotment requests from the ONUs 101 (step 101 of FIG. 9).

The requests from a plurality of ONUs 101 may be collided at that time. However, it can be detected on the OLT 201 side. When a collision is detected (step 102 of FIG. 9), the OLT 201 transmits a collision signal to all the ONUs 101 by using a downstream signal (the wavelength thereof is the common $\lambda cd$) (step 106 of FIG. 9). The ONUs 101 that have received the collision signal (step 202 of FIG. 10) transmit an allotment request again (step 201 of FIG. 10) after a random length of time (step 205 of FIG. 10).

FIG. 11-FIG. 14 illustrate the system structure of this system and the flow of the signals transmitted therein. In FIG. 11-FIG. 14, reference numeral 101 is an in-home apparatus (ONU), 201 is a station-side apparatus (OLT), 501 is an optical splitter, and 601 is an optical fiber.

Figure 13:
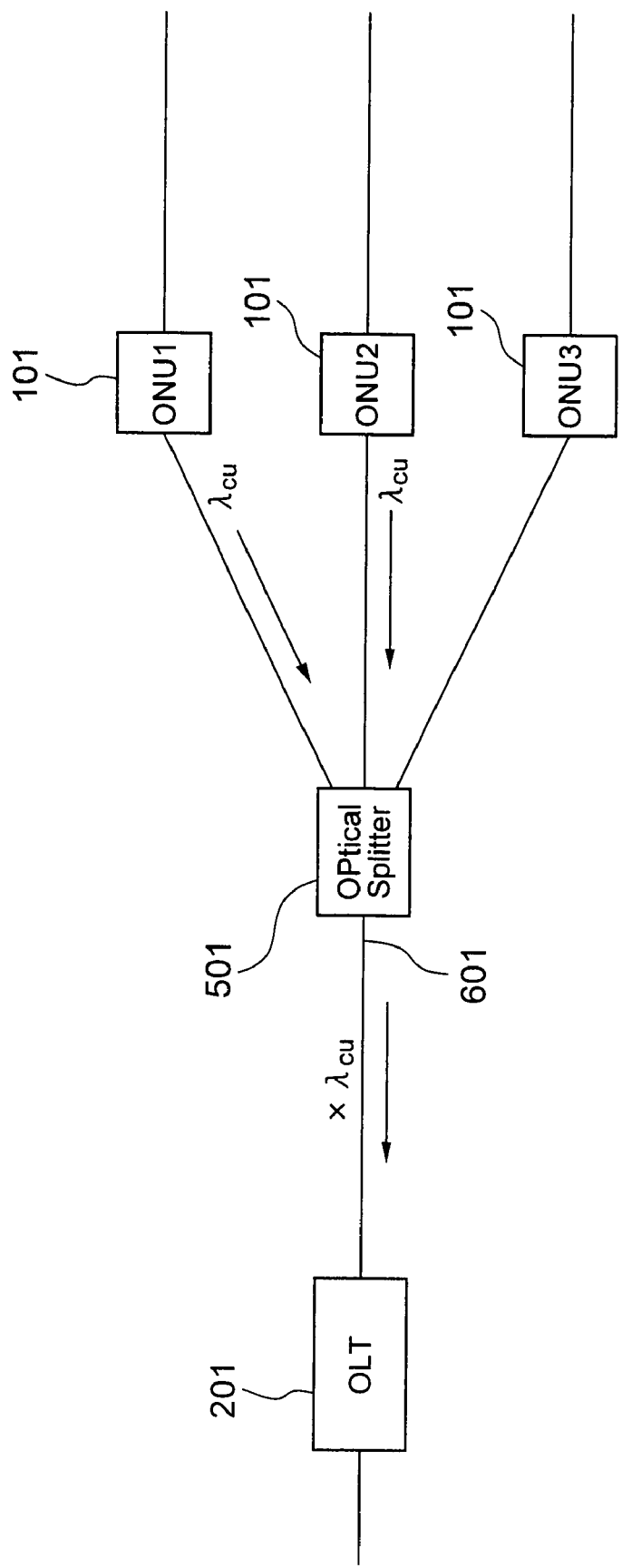
FIG. 13 is an illustration for describing the flow of the signal when there is a collision in the allotment requests from the in-home apparatuses shown in FIG. 3.
Figure 14:
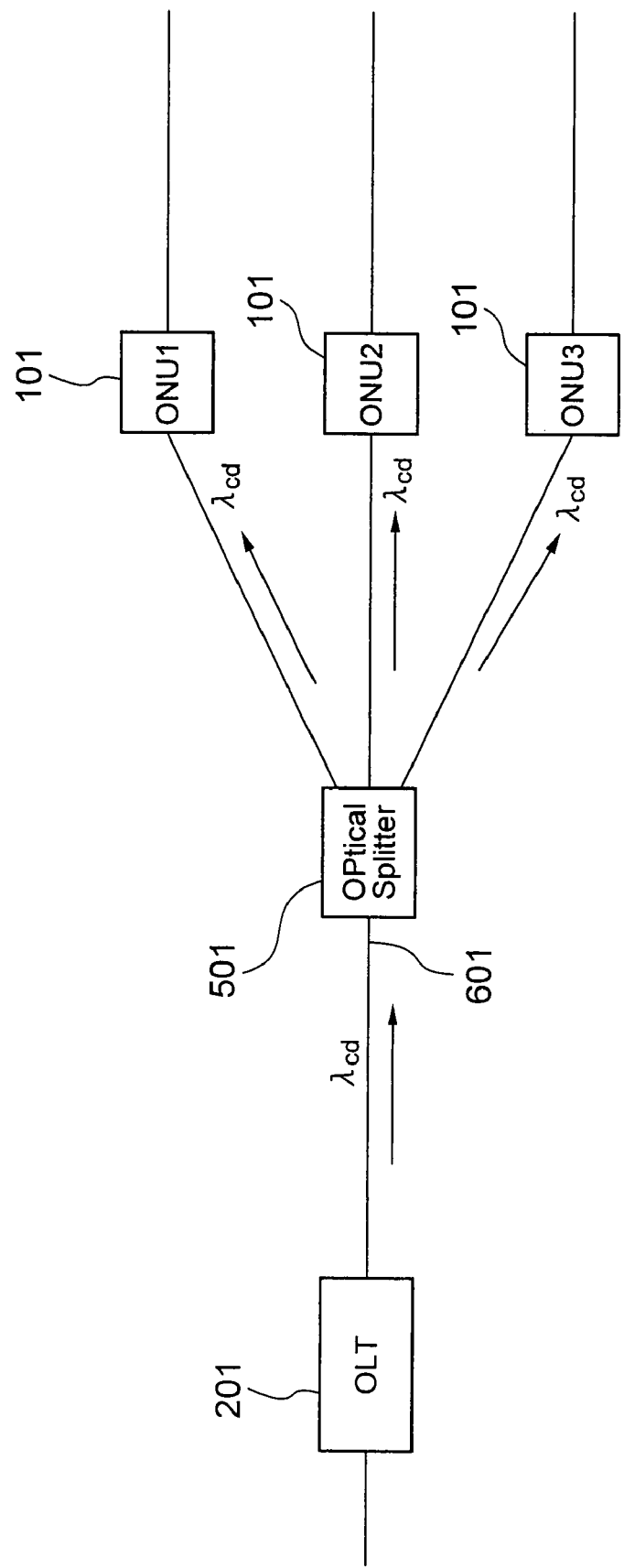
FIG. 14 is an illustration for describing the flow of the signal in the station-side apparatus, when there is a collision in the allotment requests from the in-home apparatuses shown in FIG. 3.

FIG. 13 shows the state where ONU 1 and ONU 2 transmit an allotment request simultaneously, and the signals thereof collide with each other. FIG. 14 shows the state where the OLT 201 transmits a collision signal for that.

Figure 11:
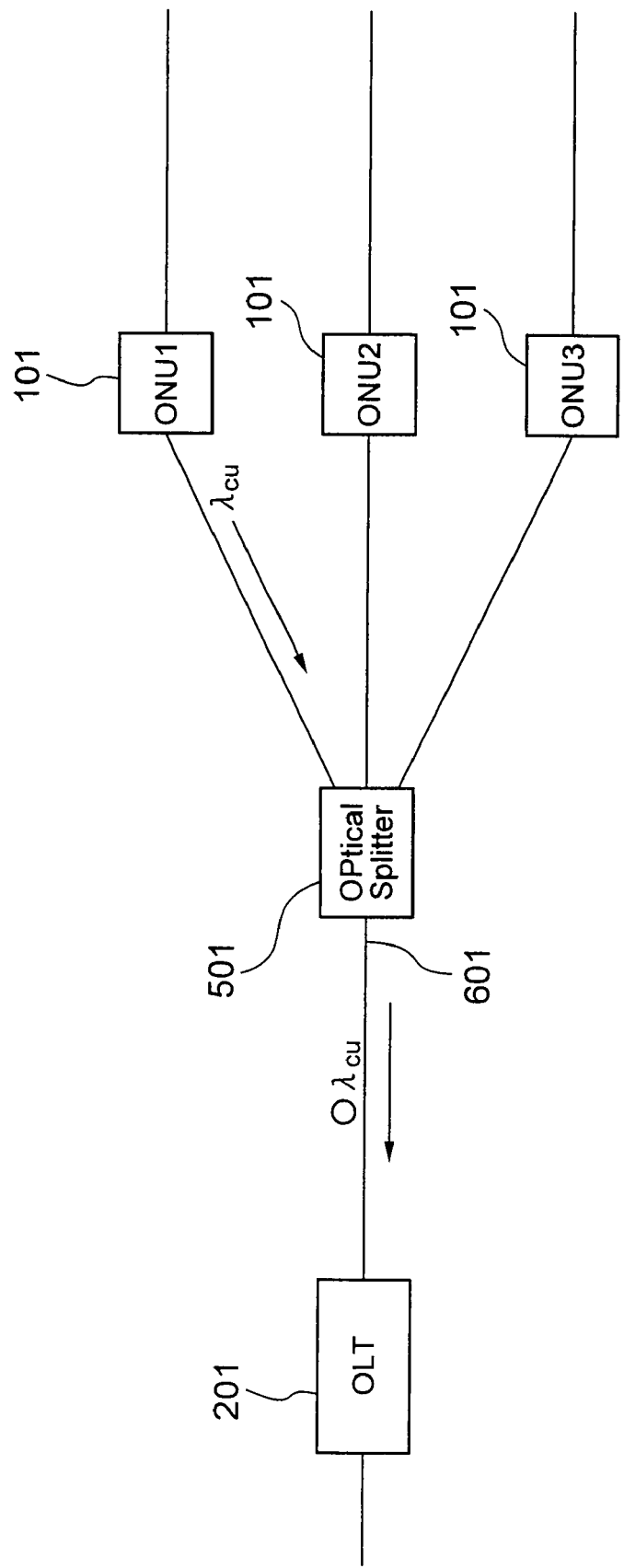
FIG. 11 is an illustration for describing the flow of the signal when there is an allotment request from the in-home apparatus shown in FIG. 3.
Figure 12:
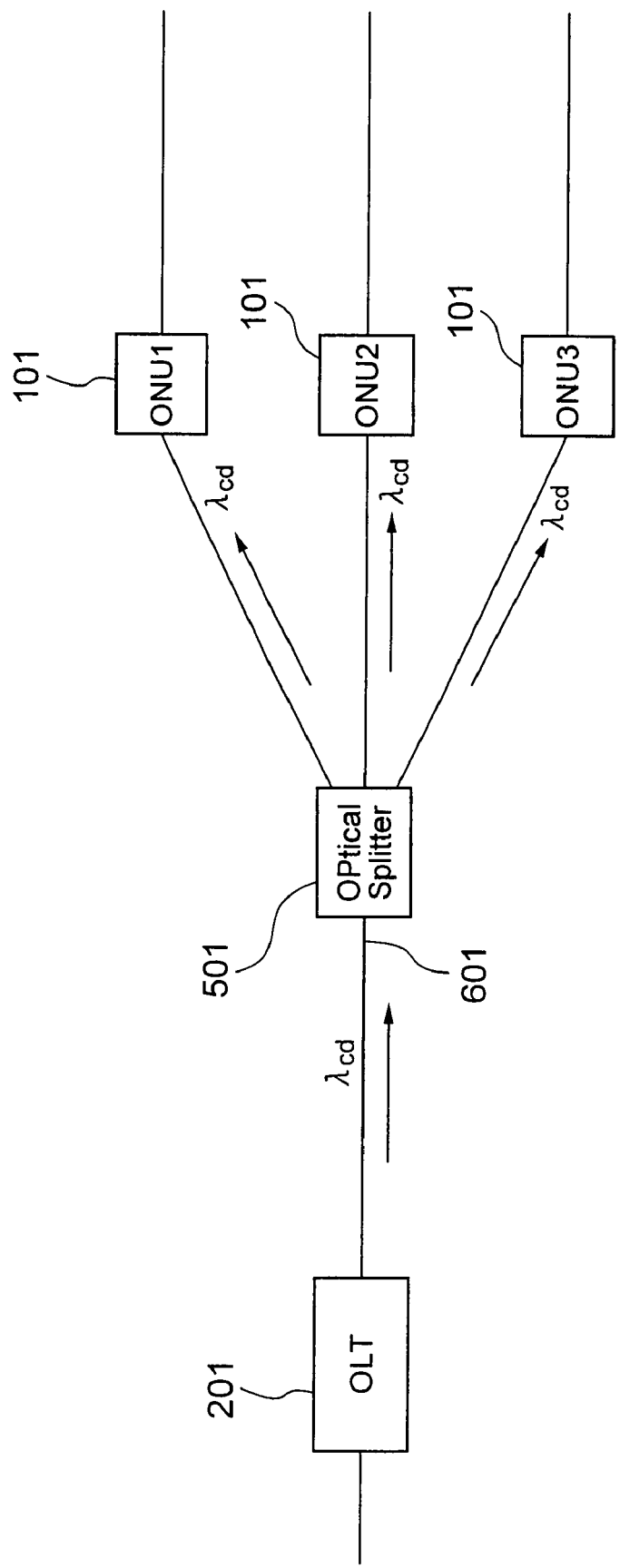
FIG. 12 is an illustration for describing the flow of the signal in the station-side apparatus, when transmitting the signal in response to the allotment request of the in-home apparatus shown in FIG. 3.

In the meantime, FIG. 11 shows the state where only the ONU 1 transmits the allotment request, and FIG. 12 shows the state where the OLT 201 responds to that (i.e. transmits the allotment information). When receiving the allotment request from the ONU 1 without a collision (step 102 of FIG. 9), the control unit 206 of the OLT 201 transfers the allotment request to the wavelength/network address unit 207 (step 103 of FIG. 9), and the control unit 206 of the OLT 201 receives the wavelength and the network address from the wavelength/network address unit 207 (step 104 of FIG. 9).

The control unit 206 of the OLT 201 transmits the received wavelength and the network address to the ONUs 101 as the allotment information (step 105 of FIG. 9). At that time, the allotment information is broadcasted to all the ONUs 101. However, the hardware address of the ONU 101 is contained in the allotment information, so that only the corresponding ONU, i.e. the ONU 1, can fetch the information.

Specifically, the allotment operation can be carried out as follows. That is, referring to FIG. 3, at the time of starting up the system, the control unit 111 of the ONU 101 transmits an allotment request signal to the optical fiber 104 through the electrooptic converting unit 114. The response signal from the OLT 201 is received through the optical fiber 104, and it is received by the control unit 111 through the photoelectric converting unit 115. The fixed wavelengths $\lambda cu$ and $\lambda cd$ for the control are set in the electrooptic converting unit 114 and the photoelectric converting unit 115. Upon receiving the allotted wavelength from the OLT 201, the control unit 111 sets the allotted wavelength to the electrooptic converting unit 110 and the photoelectric converting unit 112, and stores those in the memory 113 as well. Further, when receiving the network address from the OLT 201, the control unit 111 stores it in the memory 113 and uses it for communication performed thereafter.

Further, referring to FIG. 4, the allotment request from the ONU 101 is received by the control unit 206 through the optical fiber via the photoelectric converting unit 231. The control unit 206 transfers the allotment request to the wavelength/network address unit 207, and the control unit 206 receives the wavelength and the network address from the wavelength/network address unit 207. The control unit 206 transmits the information of the received wavelength and the network address to the optical fiber 203 via the electrooptic converting unit 230. The wavelength and the network address are allotted by the DHCP server 2071 of the wavelength/network address unit 207.

When the control unit 206 detects a collision between the requests from a plurality of ONUs 101 through the photoelectric converting unit 231, the control unit 206 transmits a collision signal to the optical fiber 203 via the photoelectric converting unit 230. The fixed wavelengths $\lambda cu$ and $\lambda cd$ for the control are set in the photoelectric converting unit 231 and the electrooptic converting unit 230.

It is noted that the present invention is also directed at a program for allowing the computers of the control unit 206 of the OLT 201 to execute such wavelength and network address allotting method.

Figure 15:
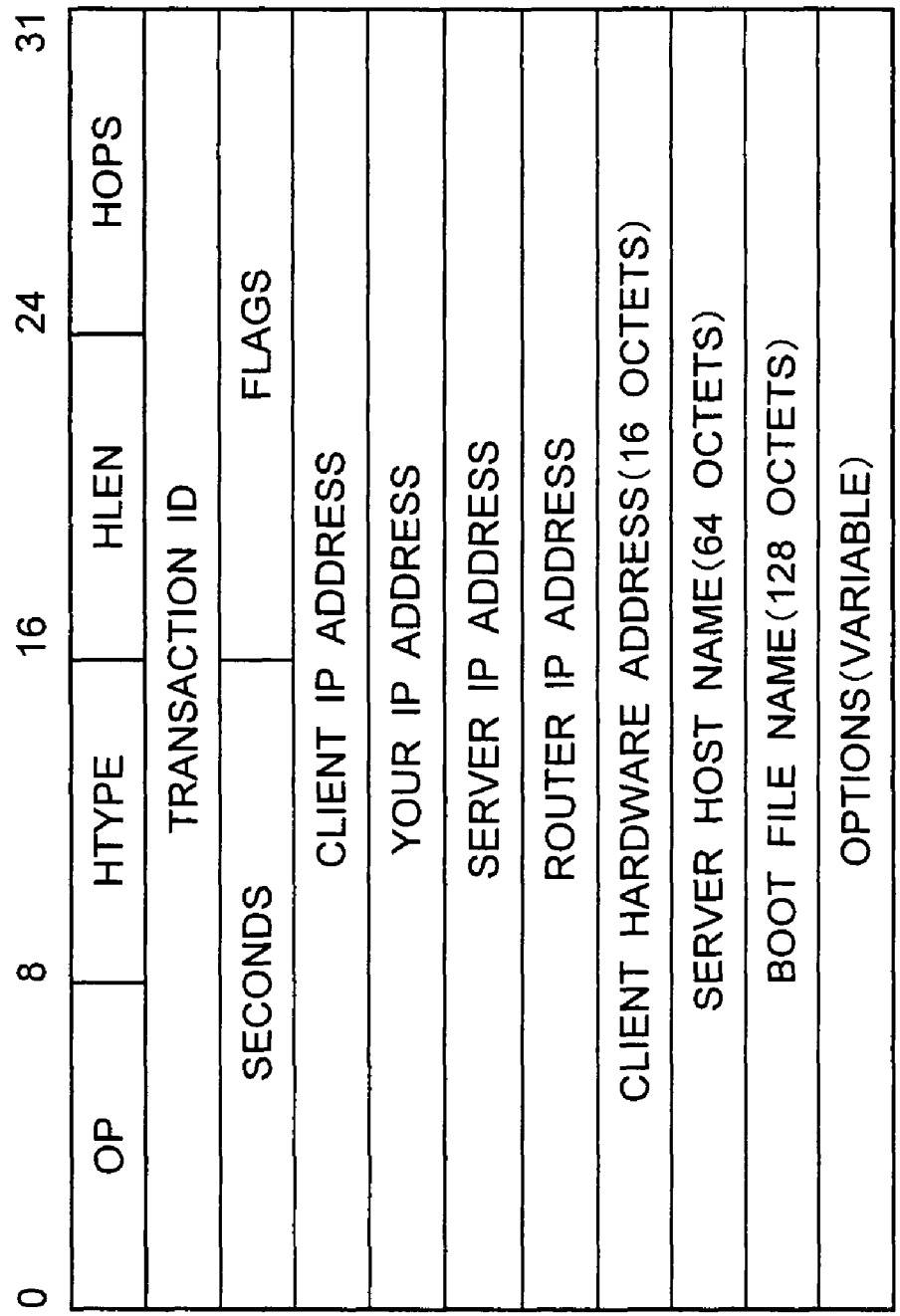
FIG. 15 illustrates a typical format of a DHCP message.

FIG. 15 shows a typical format of the DHCP message. This message is stored in a UDP (User Datagram Protocol) datagram, and stored further in an IP datagram. The method for using the area of OPTION is being regulated, and FIG. 16 illustrates the state where the subnet mask and the DHCP message type are stored in the OPTION field. In this embodiment, further, the wavelength information is stored in the OPTION field by using code numbers (for example, 128, 129) that are reserved for Site Specific Use.

FIG. 17 illustrates the case where a single network address and each of the wavelengths $\lambda 1u$, $\lambda 1d$ for the upstream and downstream are allotted to a single ONU 101. The CODE is "128", the length is 4 bytes, and the wavelengths of the upstream and the downstream are designated by 16 bits, respectively. The network address is stored in YOUR IP ADDRESS.

FIG. 6 shows an allotment table that is managed by the DHCP server 2071 internally. The network (IP) address, a pair of wavelengths, and the hardware (MAC) address are managed as a set.

FIG. 18 shows the case where the wavelength is allotted for each of the applications because the wavelengths that can be allotted are stored abundantly, for example. For discriminating the applications, the port numbers of the TCPs (Transmission Control Protocols) or the UDPs are used. A pair of wavelengths for the upstream and downstream are allotted to a pair of port numbers of the upstream and downstream. The port number information is obtained when the main signal processing units 212 and 213 refer to the header of the TCP or UDP datagram, and it is transferred to the control unit 206. The CODE is "129", the length in this case is 16 bytes, and the port number and the wavelengths of the upstream and downstream are designated by 16 bits, respectively.

FIG. 7 shows an allotment table that is managed by the DHCP server 2071 internally. A pair of port numbers, the network (IP) address, a pair of wavelengths, and the hardware (MAC) address are managed as a set. Allotment and update of the allotment are not performed for the ONU 101 that is not being used, and the wavelength and the network address for that are stored in the DHCP server.

It has been described in the above that the wavelength and the network address are allotted by a unit of each ONU 101. However, it is also possible to allot the wavelength and the network address separately for each of the work contents (application) of the ONUs 101 if necessary.

As described above, the wavelength and network address allotting method according to the present invention is capable of allotting the wavelength and the network simultaneously. Thus, the time for starting up the apparatus can be shortened. Further, through employing the dynamic allotment processing, the resources of the wavelengths and the network addresses can be saved. Furthermore, it is possible to allot the wavelength and the network address not only by an ONU unit but also by an application unit. This provides such an effect that a plurality of connections can be communicated simultaneously at a high speed. Moreover, the complicated work and errors for the setting can be suppressed, so that the cost for the apparatus maintenance can be reduced.

Although the embodiment has been described by referring to the case of TCP (or UDP)/IP network, the present invention can also be applied to other networks such as STM (Synchronous Transfer Mode) or ATM (Asynchronous Transfer Mode) wavelength multiplexing PON. In the former case, the wavelength and the circuit number can be allotted dynamically. Meanwhile, the wavelength and the virtual circuit number VC (Virtual Circuit) or VP (Virtual Path) can be allotted dynamically in the latter case. Further, the present invention can also be used for X.25 or frame relay networks. The method of allotment in such cases is the same as the case of ATM.

As described above, the wavelength and the network address are allotted simultaneously and dynamically without a waste in this embodiment. Thus, the resources of the wavelengths and the network addresses can be saved and the efficiency for the network control can be improved as well. Further, it becomes possible to allot the wavelength not only by an ONU unit but also by an application unit, thereby providing such an effect that a plurality of connections can be communicated simultaneously at a high speed.

Furthermore, a plurality of wavelengths can be allotted or released dynamically by a session unit or connection unit, so that the wavelength resource can be more effectively utilized. Thus, it becomes possible to deal flexibly with the application that has a plurality of streams within a single connection and to deal with QoS (quality of service). Moreover, it is possible to allot the wavelengths flexibly in real-time by corresponding to the load of the application and the network. Therefore, the network resource can be utilized effectively and the convergence thereof can be prevented. In addition, the complicated work for the setting can be reduced, thereby suppressing the setting errors. As a result, the cost for the system maintenance can be reduced.

As described above, the present invention achieves the dynamic and automatic allotting method of the wavelength and the network address in the wavelength multiplexing PON system. Therefore, it is possible for the present invention to be broadly used in the communication business that uses the optical communication, in the field of IT industry, etc.

What is claimed is:

1. A station-side apparatus (OLT) of a wavelength multiplexing PON system, which executes allotment of wavelengths in response to wavelength allotment requests from a plurality of in-home apparatuses (ONUs), the apparatus comprising:

a wavelength/network address allotting device that is provided with a DHCP server in advance, which dynamically allots a wavelength, the wavelength/network address allotting device comprises a wavelength/network address storing device for storing a plurality of wavelengths and network addresses to be allotted, and has a function of calling the wavelength and the network address from the wavelength/network address storing device according to an allotment request signal from the in-home apparatus, and transmitting the wavelength and the network address as an allotment signal when starting up the system;

a network address to the in-home apparatus in response to the wavelength allotment request from the in-home apparatus;

an allotment request signal receiving device for receiving the allotment request signal as a first wavelength control signal that is common to the plurality of in-home apparatuses;

an allotment signal transmitting device for transmitting the allotment signal as a second wavelength control signal that is common to the plurality of in-home apparatuses;

a collision detecting device for detecting with the first wavelength control signal that the allotment request signals from the plurality of in-home apparatuses are collided; and a collision signal transmitting device for transmitting a collision signal commonly to the plurality of in-home apparatuses by the second wavelength control signal when the collision detecting device detects a collision.

2. A wavelength and network address allotting method which executes allotment of wavelengths by a station-side apparatus (OLT) of a wavelength multiplexing PON system in response to wavelength allotment requests from a plurality of in-home apparatuses (ONUs), the method comprising steps of:

an allotment request receiving step which, when starting up the wavelength multiplexing PON system, the station-side apparatus (OLT) receives the allotment requests from the in-home apparatuses by using a first wavelength control signal that is common to the plurality of in-home apparatuses;

a collision detecting step which detects at the station-side apparatus (OLT) a collision between the allotment requests that are transmitted from the plurality of in-home apparatuses;

a readout step which reads out the wavelength and the network address to be allotted from a wavelength/network address storing device of the station-side apparatus (OLT), when a collision is not detected in the collision detecting step;

an allotment signal transmitting step which transmits and allots the wavelength and the network address read out in the readout step from the station-side apparatus (OLT) to the in-home apparatus as an allotment signal by using a second wavelength control signal that is common to the plurality of in-home apparatuses; and a collision signal transmitting step which transmits a common collision signal from the station-side apparatus (OLT) to the plurality of in-home apparatuses by using a second wavelength control signal, when a collision is detected in the collision detecting step.

* * * * *